United States Patent
Balarashti

(10) Patent No.: US 12,467,016 B1
(45) Date of Patent: Nov. 11, 2025

(54) AIR PURIFICATION CANDLE

(71) Applicant: Glow Guardian, Inc., Leawood, KS (US)

(72) Inventor: Jamie Balarashti, Leawood, KS (US)

(73) Assignee: Glow Guardian, Inc., Leawood, KS (US)

( * ) Notice: Subject to any disclaimer, the term of this patent is extended or adjusted under 35 U.S.C. 154(b) by 0 days.

(21) Appl. No.: 18/815,811

(22) Filed: Aug. 26, 2024

(51) Int. Cl.
*C11C 5/00* (2006.01)

(52) U.S. Cl.
CPC .............. *C11C 5/002* (2013.01); *C11C 5/006* (2013.01)

(58) Field of Classification Search
CPC ................................ C11C 5/002; C11C 5/006
See application file for complete search history.

(56) References Cited

U.S. PATENT DOCUMENTS

| | | | |
|---|---|---|---|
| 2009/0053268 A1* | 2/2009 | DePablo | B82Y 5/00 508/491 |
| 2013/0209371 A1* | 8/2013 | Willis | A01N 65/00 264/279 |
| 2021/0047586 A1* | 2/2021 | Giffin | B01J 23/42 |

* cited by examiner

*Primary Examiner* — Latosha Hines
(74) *Attorney, Agent, or Firm* — Rahman LLC

(57) ABSTRACT

A candle for air purification includes a wax composition includes a blend of long-chain waxes, medium-chain waxes, and short-chain waxes. The long-chain waxes are present in an amount of 0-15% of a total composition of the wax composition, the medium-chain waxes are present in an amount of 60-100% of the total composition of the wax composition, and the short-chain waxes are present in an amount of 0-15% of the total composition of the wax composition. The candle also includes a plurality of metal nanoparticles embedded within the wax composition. The plurality of nanoparticles are less than 50 nm in size and are composed of alloy metals. The candle also includes a wick for burning the wax composition.

19 Claims, 14 Drawing Sheets

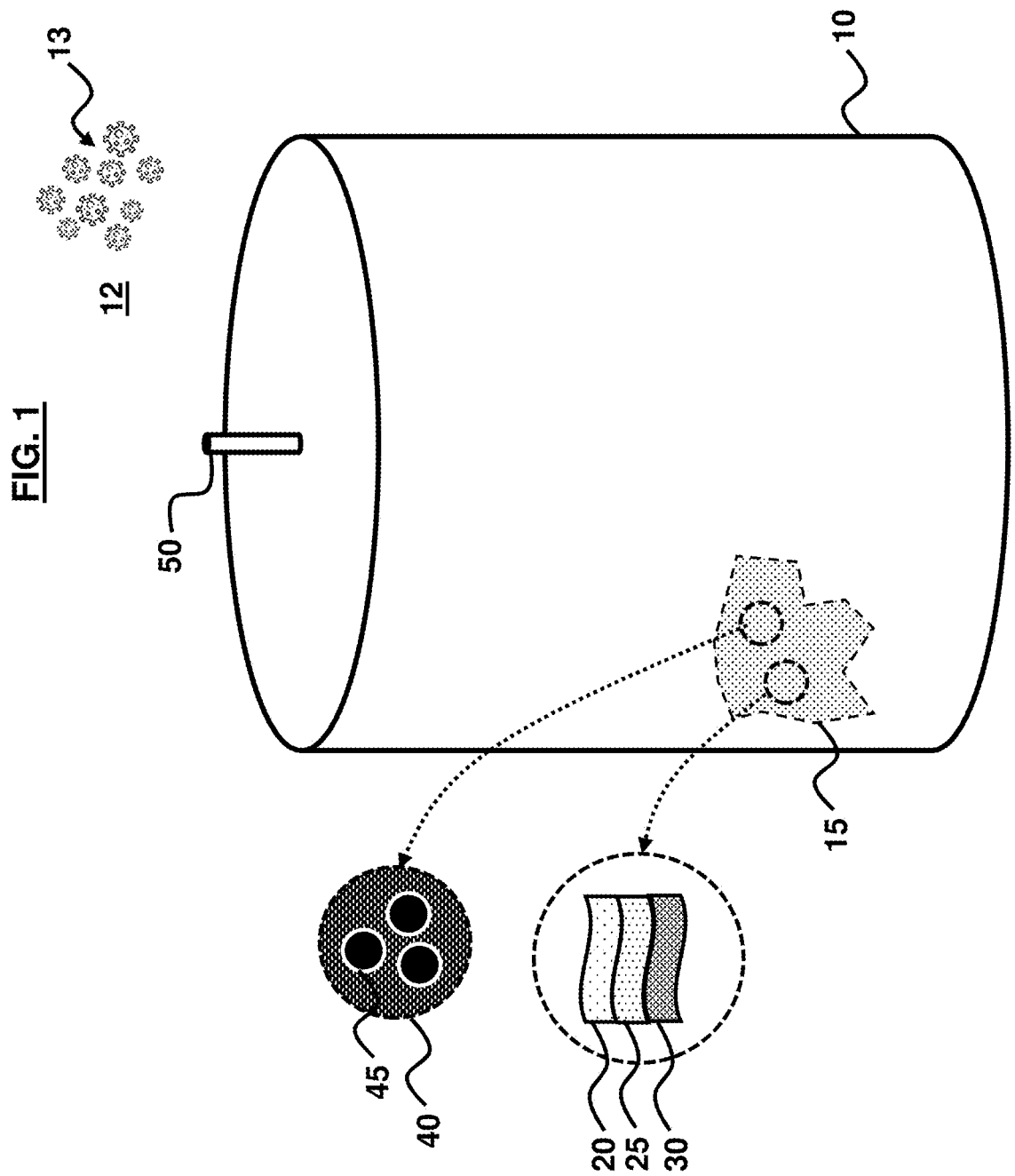

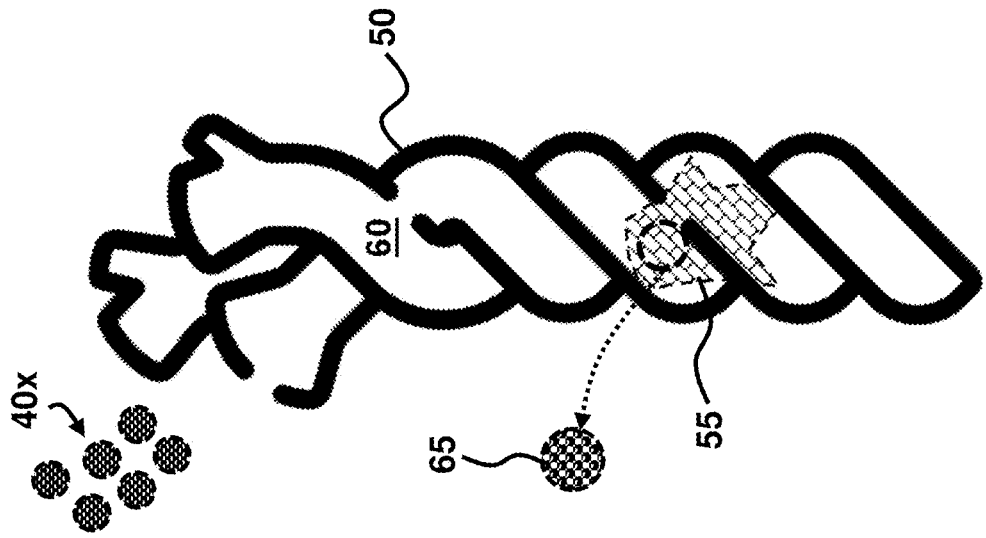
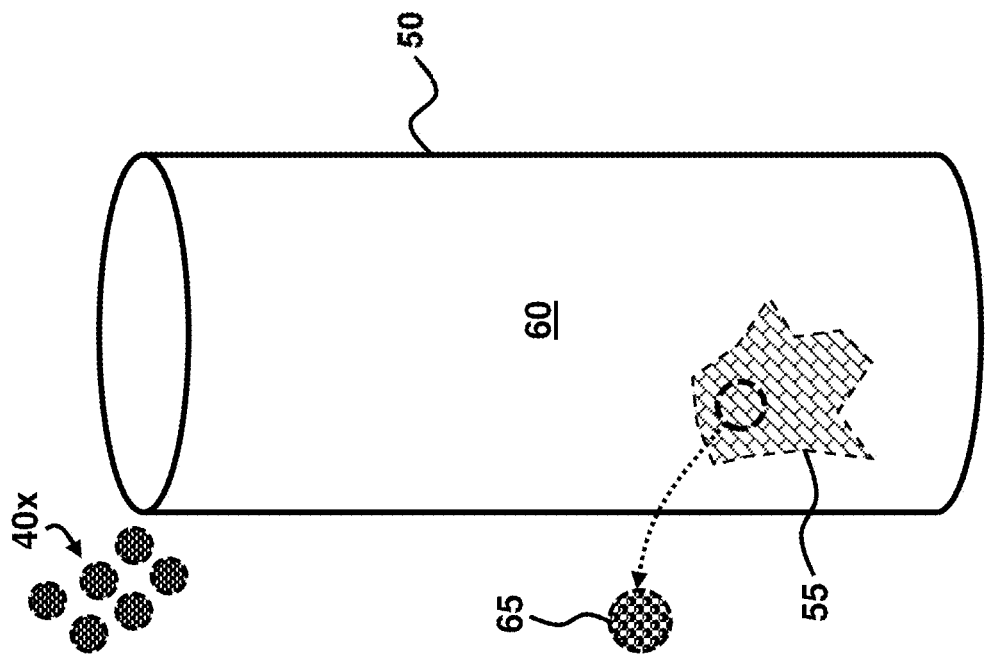

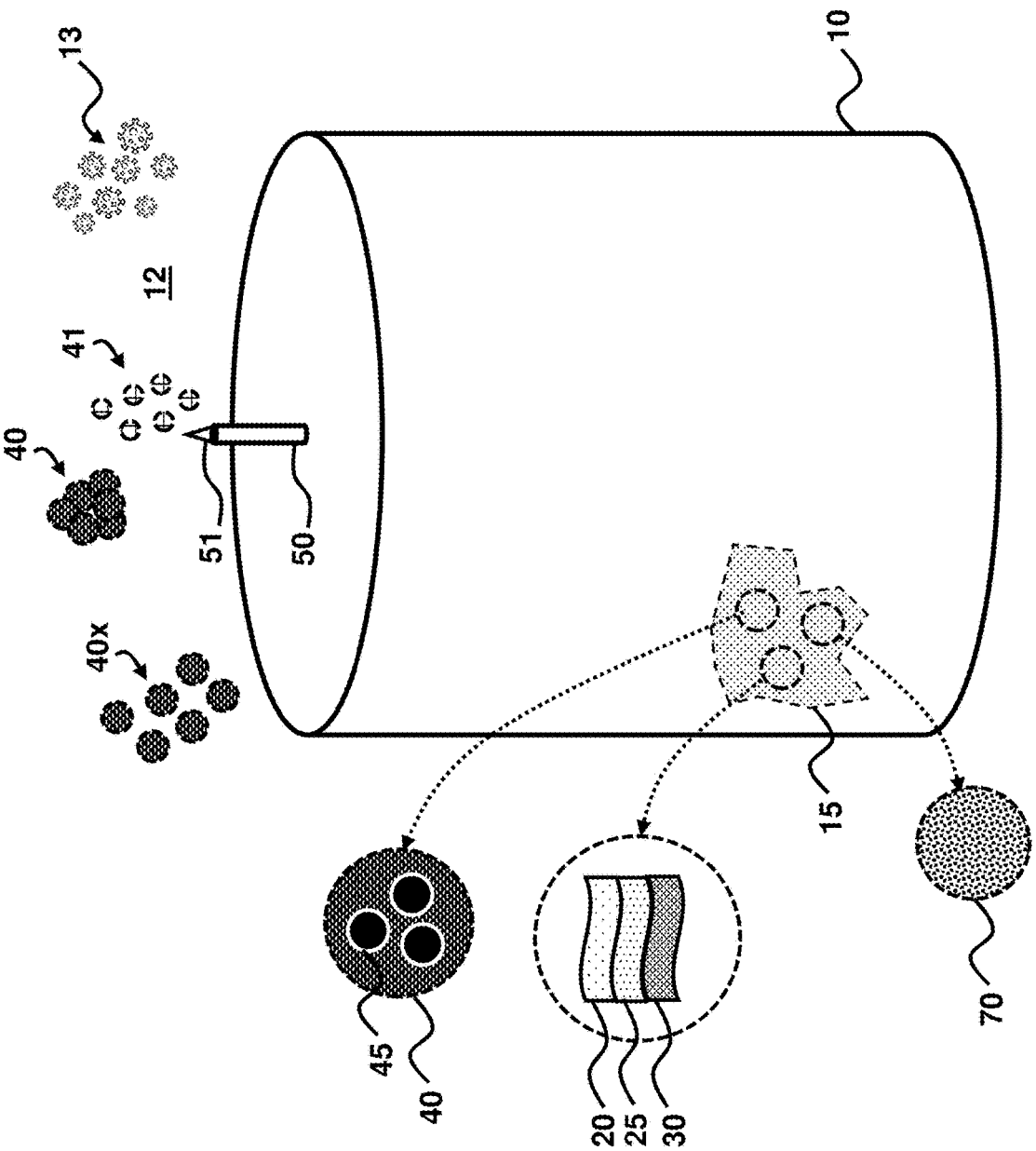

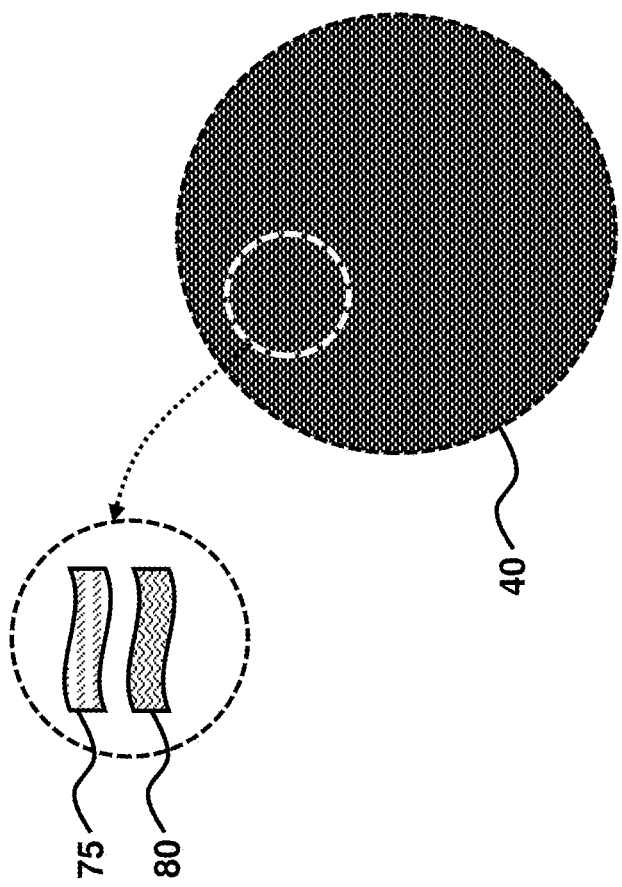

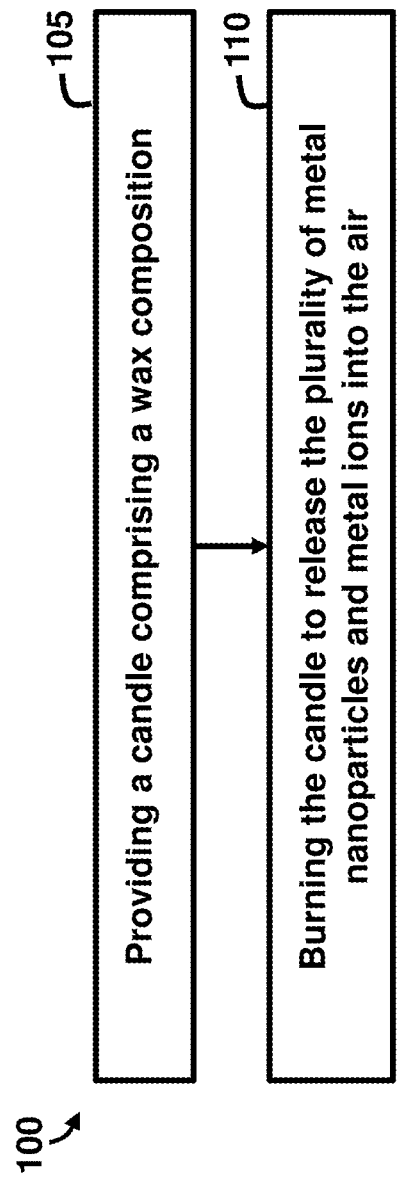

FIG. 8

| Trial | Challenge Species | Chamber Size (m³) | Target Particle Size (µm) | Challenge Conc. (#/L) | Trial Time (min) | Bioaerosol Sampling Time Points (min) | Sampling Devices | Plating and Enumeration |
|---|---|---|---|---|---|---|---|---|
| Control Control Control | MS2 Bacteriophage (RNA Virus) | 30.0 | 100nm-1.0µm | $10^4$-$10^5$ | 90 | 0, 2, 4, 8, 12, 16, 20, 30, 45, 60, 90 | AGI 30 Impingers | All samples in triplicate |
| Candle 10 Candle 10 Candle 10 | MS2 Bacteriophage (RNA Virus) | 30.0 | 100nm-1.0µm | $10^4$-$10^5$ | 90 | 0, 2, 4, 8, 12, 16, 20, 30, 45, 60, 90 | AGI 30 Impingers | All samples in triplicate |

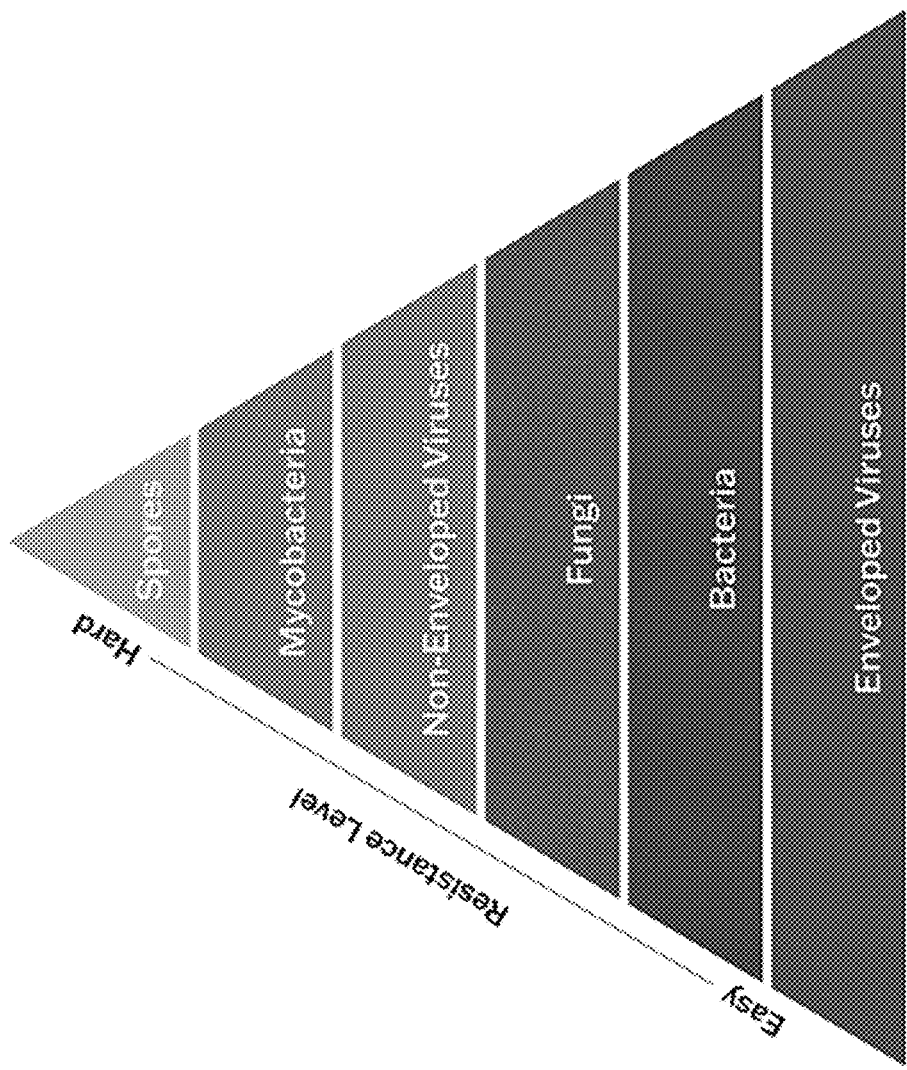

FIG. 10

Clean Air Delivery Rate Summary Data

| Trial | Species | Testing Chamber (m³) | (t = 30min) | | (t = 60min) | |
|---|---|---|---|---|---|---|
| | | | Air Change Per Hour (eqACH) | Clean Air Delivery Rate (CADR) | Air Change Per Hour (eqACH) | Clean Air Delivery Rate (CADR) |
| N/A | MS2 Bacteriophage | 30 | 3.65 | 64.4 | 2.36 | 41.7 |
| N/A | MS2 Bacteriophage | 30 | 2.82 | 49.8 | 2.32 | 41.0 |
| N/A | MS2 Bacteriophage | 30 | 3.37 | 59.5 | 2.28 | 40.3 |
| Group Average ± Standard Deviation | | | 3.28 ± 0.42 | 57.9 ± 7.4 | 2.32 ± 0.04 | 41.02 ± 0.7 |

FIG. 11

Net Log and Net Percent Reduction for All Trials (Trials minus Controls)

| Bioaerosol Type | Species (description) | Reduction Type | Trial Time (minutes) | | | | |
|---|---|---|---|---|---|---|---|
| | | | 4 | 8 | 12 | 16 | 20 |
| Virus | *MS2 (RNA Virus)* | *Net Log Reduction<br>Net % Reduction* | -0.18<br>33.8603% | -0.14<br>27.0747% | -0.34<br>53.9906% | -0.40<br>60.1841% | -0.49<br>67.4144% |
| Virus | *MS2 (RNA Virus)* | *Net Log Reduction<br>Net % Reduction* | -0.06<br>13.3937% | -0.18<br>34.5117% | -0.35<br>55.6992% | -0.34<br>54.1747% | -0.39<br>59.6198% |
| Virus | *MS2 (RNA Virus)* | *Net Log Reduction<br>Net % Reduction* | -0.15<br>29.8298% | -0.24<br>42.9622% | -0.38<br>57.8966% | -0.38<br>58.0113% | -0.46<br>65.5931% |
| All Trial Averages ± St. Dev. | | *Net Log Reduction<br>Net % Reduction* | -0.13±0.06<br>26%±11% | -0.19±0.05<br>35%±8% | -0.36±0.02<br>56%±2% | -0.37±0.03<br>57%±3% | -0.45±0.05<br>64%±4% |

FIG. 11 (continued)

Net Log and Net Percent Reduction for All Trials (Trials minus Controls)

| Bioaerosol Type | Species (description) | Reduction Type | Trial Time (minutes) | | | |
|---|---|---|---|---|---|---|
| | | | 30 | 45 | 60 | 90 |
| Virus | MS2 (RNA Virus) | Net Log Reduction<br>Net % Reduction | -0.77<br>83.0494% | -0.77<br>83.1082% | -1.08<br>91.6451% | -1.26<br>94.4835% |
| Virus | MS2 (RNA Virus) | Net Log Reduction<br>Net % Reduction | -0.56<br>72.2742% | -0.68<br>79.2727% | -1.11<br>92.2256% | -1.36<br>95.5967% |
| Virus | MS2 (RNA Virus) | Net Log Reduction<br>Net % Reduction | -0.73<br>81.4292% | -0.82<br>84.7808% | -1.04<br>90.9297% | -1.37<br>95.7090% |
| All Trial Averages ± St. Dev. | | Net Log Reduction<br>Net % Reduction | -0.69±0.11<br>79%±6% | -0.76±0.07<br>82%±3% | -1.08±0.03<br>92%±1% | -1.33±0.06<br>95.3%±0.7% |

FIG. 12

Candle Net LOG and Net % Broad-Range Bioaerosol Summary with Same Time Points

| Species Type | Trial Set (Description) | Reduction Type | Trial Time (minutes) | | | |
|---|---|---|---|---|---|---|
| | | | 0 | 15 | 30 | 45 |
| Virus | MS2 bacteriophage Trial Summary | *Net Log Reduction*<br>*Net % Reduction* | 0.00±0.00<br>0.00%±0.00% | -0.65±0.05<br>73.23%±20.30% | -1.12±0.00<br>92.43%±0.60% | -1.29±0.00<br>95.09%±0.70% |
| | Phi X bacteriophage Trial Summary | *Net Log Reduction*<br>*Net % Reduction* | 0.00±0.00<br>0.00%±0.00% | -0.33±0.15<br>52.11%±15.97% | -0.58±0.13<br>73.23%±8.17% | -0.76±0.18<br>81.95%±7.23% |
| Gram-Positive Bacteria | *S. epidermidis* Trial Summary | *Net Log Reduction*<br>*Net % Reduction* | 0.00±0.00<br>0.00%±0.00% | -0.22±0.11<br>38.92%±15.27% | -0.40±0.23<br>57.70%±21.66% | -0.68±0.23<br>77.54%±11.36% |
| | *L. innocua* Trial Summary | *Net Log Reduction*<br>*Net % Reduction* | 0.00±0.00<br>0.00%±0.00% | -0.43±0.00<br>62.83%±6.49% | -0.49±0.00<br>66.64%±13.05% | -0.79±0.00<br>81.47%±12.68% |
| Gram-Negative Bacteria | *K. aerogenes* Trial Summary | *Net Log Reduction*<br>*Net % Reduction* | 0.00±0.00<br>0.00%±0.00% | -0.57±0.03<br>72.87%±1.95% | -1.14±0.18<br>92.45%±2.98% | -1.60±0.25<br>97.26%±1.52% |
| | *P. syringae* Trial Summary | *Net Log Reduction*<br>*Net % Reduction* | 0.00±0.00<br>0.00%±0.00% | -1.23±0.16<br>93.90%±2.24% | -1.29±0.29<br>94.34%±3.51% | -1.45±0.13<br>96.41%±1.07% |
| Mold Spore | *A. brasiliensis* Trial Summary | *Net Log Reduction*<br>*Net % Reduction* | 0.00±0.00<br>0.00%±0.00% | -0.09±0.04<br>17.60%±7.78% | -0.07±0.03<br>15.18%±5.35% | -0.27±0.16<br>44.86%±19.92% |
| Yeast | Candida Trial Summary | *Net Log Reduction*<br>*Net % Reduction* | 0.00±0.00<br>0.00%±0.00% | -0.26±0.19<br>42.39%±24.45% | -0.66±0.04<br>77.97%±1.88% | -1.12±0.06<br>89.22%±5.38% |

FIG. 12
(continued)

Candle Net LOG and Net % Broad-Range Bioaerosol Summary with Same Time Points

| Species Type | Trial Set (Description) | Reduction Type | Trial Time (minutes) | | |
|---|---|---|---|---|---|
| | | | 60 | 90 | 120 |
| Virus | MS2 bacteriophage Trial Summary | Net Log Reduction<br>Net % Reduction | -1.52±0.00<br>98.03%±0.39% | -1.99±0.48<br>98.64%±1.25% | -2.65±0.32<br>99.74%±0.17% |
| Virus | Phi X bacteriophage Trial Summary | Net Log Reduction<br>Net % Reduction | -0.92±0.00<br>87.90%±0.01% | -1.57±0.07<br>97.27%±0.43% | -2.08±0.12<br>99.15%±0.23% |
| Gram-Positive Bacteria | S. epidermidis Trial Summary | Net Log Reduction<br>Net % Reduction | -1.38±0.27<br>77.54%±11.36% | -2.08±0.21<br>95.39%±2.67% | -3.21±0.23<br>99.12%±0.42% |
| Gram-Positive Bacteria | L. innocua Trial Summary | Net Log Reduction<br>Net % Reduction | -1.66±0.00<br>97.79%±0.43% | -2.53±0.00<br>99.68%±0.17% | -3.53±0.00<br>99.97%±0.01% |
| Gram-Negative Bacteria | K. aerogenes Trial Summary | Net Log Reduction<br>Net % Reduction | -2.16±0.24<br>99.25%±0.40% | -3.11±0.28<br>99.91%±0.05% | -4.04±0.05<br>99.99%±0.00% |
| Gram-Negative Bacteria | P. syringae Trial Summary | Net Log Reduction<br>Net % Reduction | -1.88±0.25<br>98.56%±0.79% | -1.91±0.17<br>98.72%±0.49% | -2.68±0.16<br>99.78%±0.08% |
| Mold Spore | A. brasiliensis Trial Summary | Net Log Reduction<br>Net % Reduction | -0.50±0.04<br>68.50%±2.78% | -0.59±0.05<br>74.18%±2.83% | -0.75±0.10<br>81.84%±4.32% |
| Yeast | Candida Trial Summary | Net Log Reduction<br>Net % Reduction | -1.28±0.050<br>92.94%±1.91% | -1.57±0.14<br>96.51%±1.87% | -1.7±0.32<br>97.71%±1.57% |

AIR PURIFICATION CANDLE

BACKGROUND

Technical Field

The embodiments herein generally relate to air purification systems, and more particularly to candles that are air purification candles to neutralize and remove various airborne pathogens.

Description of the Related Art

This background description includes information that may be useful in understanding the present invention. It is not an admission that any of the information provided herein is prior art or relevant to the presently claimed invention or that any publication specifically or implicitly referenced is prior art.

There is an escalating concern over indoor air quality, an issue magnified by increasing evidence of its impact on health. Modern indoor environments are often plagued by a variety of airborne pathogens, including bacteria, viruses, and spores. These contaminants pose significant risks, particularly in terms of respiratory health, and have been linked to a range of illnesses. The urgency to address these risks has never been more apparent, especially considering recent global health events that have underscored the importance of maintaining clean and safe indoor air.

Current methods of air purification, while varied, present notable limitations. Systems such as high efficiency particulate air (HEPA) filters, though effective in trapping certain particles, require significant energy to operate and do not neutralize pathogens, necessitating frequent filter changes and maintenance. UV-C light purifiers offer pathogen neutralization capabilities but raise concerns regarding safety due to inadvertent UV-C exposure and the potential for harmful ozone generation. UV-C lights also do not remove the deactivated microorganism from the breathing environment thus leaving the potential for allergic and immune response regardless of the living status of the microorganisms. UV emitting devices also suffer deficiencies in that they require substantial energy input to operate. Ionizers and electrostatic precipitators can effectively eliminate particulate matter, but ionizers do not deactivate or kill microorganism, similar to HEPA units. These still live microorganisms are deposited onto all surfaces within the treated space, thus posing a possible fomite contamination risk. Ionic and electrostatic air purifiers also struggle with ozone production and are less effective against larger particles, such as mold spores, pollen and dust. In addition, both units require electrical energy input, much like all other current air purification methods on the market.

U.S. Patent Application Publication No. 2013/0209371 published to Willis on Aug. 15, 2013 describes a candle having a unique blend of ingredients that are formulated to reduce a broad spectrum of germs in the area of the candle. The candle in the '371 publication utilizes vapor adsorption of various essential oils onto microorganisms in order to perform the germicidal functions. It has also been shown that typical in-air vapor concentrations of essential oils needed to achieve substantial germicidal efficacy are typically only achievable via active vaporization of the essential oil and not likely obtainable with the burning of a candle infused with essential oils. In addition, the vaporization of essential oils may be more readily achieved via other methods, such as air reed diffuser systems or heated vaporizers currently on the market. Moreover, it has also been shown that typical in-air vapor concentrations of essential oils required to achieve efficacy against airborne pathogens are also typically intolerable to humans due to irritation of the upper and lower respiratory tract. Therefore, the efficacy of the candle described in the '371 publication may not be sufficient for deactivating airborne microorganisms. Vaporization technologies, despite their merits, often fall short in offering a comprehensive solution that is both energy-efficient, poses no irritation or harm to the user, and is capable of addressing a wide range of airborne contaminants.

The market, therefore, presents a clear gap: a need for an air purification solution that is not only effective across various types of airborne pathogens but is also non-toxic, non-irritant, environmentally sustainable, and user-friendly. This need calls for a passive, low-maintenance solution that integrates effortlessly into daily life, providing a natural and safer alternative to mechanical and electric air purifiers.

SUMMARY

In view of the foregoing, an embodiment herein provides a candle for air purification, the candle comprising a wax composition comprising a blend of long-chain waxes, medium-chain waxes, and short-chain waxes, wherein the long-chain waxes are present in an amount of 0-15% of a total composition of the wax composition, the medium-chain waxes are present in an amount of 60-100% of the total composition of the wax composition, and the short-chain waxes are present in an amount of 0-15% of the total composition of the wax composition. The candle further comprises a plurality of metal nanoparticles embedded within the wax composition, wherein the plurality of nanoparticles are less than 25 nm in size and are composed of one or multiple alloy metals. It is the metal nanoparticle that serves as the primary functional efficacy of the candle. The candle further comprises a wick for burning the wax composition.

The long-chain waxes may comprise natural waxes such as hydrogenated jojoba wax or other naturally derived long chain wax. The medium-chain waxes may comprise soy wax, coconut wax, palm wax, olive wax, apricot wax, or other naturally derived wax, or a combination thereof. The short-chain waxes may be derived from soy, coconut, or other organic sources containing short-chain oils or waxes. The blended waxes are infused with these metal nanoparticles for the candle. The alloy metals may comprise silver, copper, zinc, or gold alloys, or a combination thereof. The concentration of the plurality of metal nanoparticles may be in a range of 1 to 50 micrograms of nanoparticles per gram of wax. The nanoparticles may be coated with biocompatible materials or functionalized with a hydroxyl or carboxyl-based group. The wick may comprise a braided cotton core, modified cotton wick infused with additional metal nanofibers or wood; and a coating comprising wax or blend.

The composition of the wax of the wick may be different from the wax composition. The candle may comprise metal nanowires or nanofibers integrated into the wick to aid in additional nanoparticle dissemination. The metal nanowires or nanofibers may be composed of silver, copper, gold, or zinc, or a combination thereof and may or may not be functionalized as described previously. The metal nanowires or nanofibers may generate additional ionized metal nanoparticles during burning. The candle may comprise functional additives blended with the wax composition, wherein the functional additives may comprise essential oils, terpenes, and other natural antimicrobial compounds, or a combination thereof. The candle may comprise fragrance additives blended with the wax composition, wherein the fragrance additives may comprise essential oils, terpenes, and other suitable fragrance compounds to enhance the appeal of the candle. The burning rate of the candle may be between 5 and 20 grams per hour.

Another embodiment provides a method for air purification, the method comprising providing a candle comprising a wax composition, wherein the wax composition comprises a blend of long-chain waxes, medium-chain waxes, and short-chain waxes, wherein the long-chain waxes are present in an amount of 0-15% of a total composition of the wax composition, the medium-chain waxes are present in an amount of 60-100% of the total composition of the wax composition, and the short-chain waxes are present in an amount of 0-15% of the total composition of the wax composition; a plurality of metal nanoparticles embedded within the wax composition, wherein the plurality of nanoparticles are less than 25 nm in size and are composed of alloy metals; and a wick for burning the wax composition. The method further comprises burning the candle to release the plurality of metal nanoparticles and metal ions into the air. The released nanoparticles may agglomerate and neutralize airborne microorganisms. The candle may comprise metal nanowires or nanofibers integrated into the wick, and wherein the metal nanowires or nanofibers may generate additional metal nanoparticles during burning of the candle. The burning rate of the candle may be between 5 and 20 grams per hour.

Another embodiment provides a method for manufacturing a candle, the method comprising blending long-chain waxes, medium-chain waxes, and short-chain waxes to form a wax composition; integrating metal nanoparticles into the wax composition; fabricating a wick; integrating the wick into the wax composition; and allowing the wax composition to solidify. The blending may comprise hydrogenating at least a portion of the long-chain waxes. The integrating of the metal nanoparticles into the wax composition may comprise high-shear mixing.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is a schematic diagram illustrating an air purification candle, according to an embodiment herein;

FIG. 3A is a schematic diagram illustrating further aspects of the wick of the candle of FIG. 1, according to an embodiment herein;

FIG. 3B is a schematic diagram illustrating further aspects of another example of the wick of the candle of FIG. 1, according to an embodiment herein;

FIG. 4 is a schematic diagram illustrating further aspects of the candle of FIG. 1, according to an embodiment herein;

FIG. 5 is a schematic diagram illustrating aspects of the nanoparticles of the candle of FIG. 1, according to an embodiment herein;

FIG. 6 is a flow diagram illustrating a method of performing air purification, according to an embodiment herein;

FIG. 8 is a table showing a test matrix for ASHRAE 241 bioaerosol testing, according to an experiment;

FIG. 9 is an illustration of the FDA cataloged resistance level for different microorganism types;

FIG. 10 is a table showing the clean air delivery rate (CADR) for aerosolized MS2 by the candle, according to an experiment;

FIG. 11 is a table showing the net log and associated net percent reduction values for the candle at each timepoint, according to an experiment; and FIG. 12 is a table showing the candle net log and net percentage associated with a broad-range bioaerosol, according to an experiment.

Figure 2B:
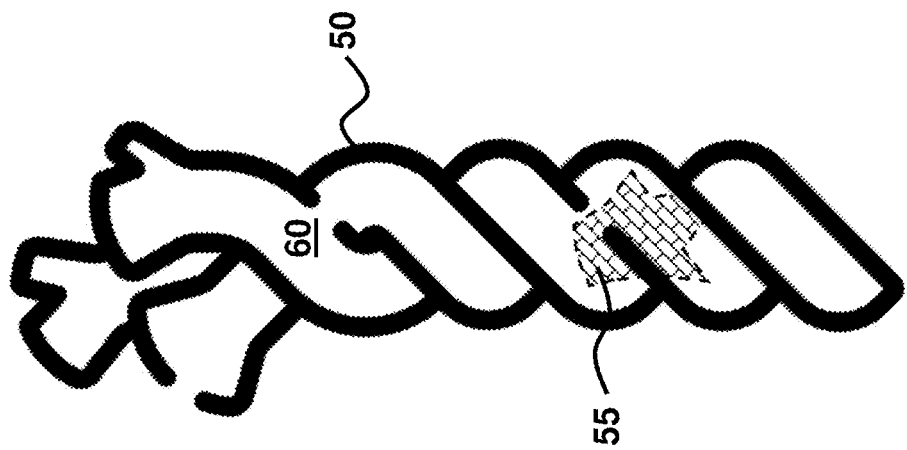
FIG. 2B is a schematic diagram illustrating aspects of another example of the wick of the candle of FIG. 1, according to an embodiment herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. The following description of particular embodiment(s) is merely exemplary in nature and is in no way intended to limit the scope of the invention, its application, or uses, which can, of course, vary.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" or "any of X, Y, and Z" may be construed as X only, Y only, Z only, or any combination of two or more items X, Y, and Z (e.g., XYZ, XY, XZ, YZ).

The description herein describes inventive examples to enable those skilled in the art to practice the embodiments herein and illustrates the best mode of practicing the embodiments herein. Upon reading the following description in light of the accompanying drawing figures, those skilled in the art will understand the concepts of the disclosure and will recognize applications of these concepts not particularly addressed herein.

The terms first, second, etc. may be used herein to describe various elements, but these elements should not be limited by these terms as such terms are only used to distinguish one element from another. For example, a first element could be termed a second element, and, similarly, a second element could be termed a first element, etc. without departing from the scope of the present disclosure. As used herein, the term "and/or" includes any and all combinations of one or more of the associated listed items.

Furthermore, although the terms "final", "first", "second", "upper", "lower", "bottom", "side", "intermediate", "middle", and "top", etc. may be used herein to describe various elements, but these elements should not be limited by these terms. These terms are only used to distinguish one element from another. For example, a first element could be termed an "top" element and, similarly, a second element could be termed a "top" element depending on the relative orientations of these elements.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

The embodiments herein provide a candle configured to significantly improve indoor air quality by actively purifying the air from harmful bioaerosols, including bacteria, viruses, yeast and spores, and potentially other disease-causing microorganisms. The candle represents a groundbreaking approach in air purification technology, utilizing a unique blend of waxes and nanoparticles to achieve its purifying effects. Contrary to conventional solutions, the candle provided by the embodiments herein does not rely on vaporization of essential oils to achieve efficacy against microorganisms. The embodiments herein provide a simple yet effective solution, addressing the limitations of current air purification methods. Referring now to the drawings, and more particularly to FIGS. 1 through 12, where similar reference characters denote corresponding features consistently throughout the figures, there are shown preferred embodiments. In the drawings, the size and relative sizes of components, layers, and regions, etc. may be exaggerated for clarity.

FIG. 1 illustrates a candle 10 for air purification of air 12. In an example, the air 12 may contain various airborne microorganisms 13, which the candle 10 is used to neutralize. The candle 10 may comprise any suitable shape, size, color, and can contain any suitable type of fragrance or essential oil. The candle 10 comprises a wax composition 15 comprising a carefully selected blend of long-chain waxes 20, medium-chain waxes 25, and short-chain waxes 30. In the drawings, the wax composition 15 is depicted as constituting a portion of the candle 10. However, this is for illustrative purposes only, and the entire body of the candle 10 is equally blended with the wax composition 15. The proportions of these waxes 20, 25, 30 help improve the performance of the candle 10 as it relates to the efficacy in the air purification process. The long-chain waxes 20, which may contain polar and/or nonpolar polymers, are present in an amount of 0-15% of a total composition of the wax composition 15, the medium-chain waxes 25 are present in an amount of 60-100% of the total composition of the wax composition 15, and the short-chain waxes 30 are present in an amount of 0-15% of the total composition of the wax composition 15. In an example, the long-chain waxes 20 may comprise hydrogenated jojoba wax or other natural long chain waxes (C30-C50, containing 30 to 50 carbon length chains). For example, the long-chain waxes 20 may provide enhanced agglomeration effects and structure and stability to the candle 10, ensuring a consistent burn and a stable flame. The medium-chain waxes 25 may comprise soy wax, coconut wax, palm wax, olive wax, or apricot wax, or a combination thereof, according to some examples. For example, the medium-chain waxes 25 help in the ability of the candle 10 to release the necessary compounds into the air 13 during the burning process, which effectively neutralizes the airborne microorganisms 13. The short-chain waxes 30 may be derived from soy, coconut, or other organic sources containing short-chain oils or waxes, in some examples. In an example, the short-chain waxes 30 help to modulate the burning characteristics of the candle 10, ensuring a clean and efficient burn that maximizes the release of the air-purifying compounds.

The specific combination of long-chain waxes 20, medium-chain waxes 25, and short-chain waxes 30 in the wax composition 15 creates a candle 10 that effectively purifies the air 12 by neutralizing airborne microorganisms 13. The carefully balanced proportions of these waxes work together to create a stable, efficient, and effective candle 10 that releases the necessary compounds of the metal nanoparticles 40 into the air 12 during the burning process. This innovative wax composition 15 represents a significant advancement in the field of air purification, providing a simple and effective solution for improving indoor air quality.

The long-chain waxes 20 are a type of wax that includes long hydrocarbon chains, typically containing 20 or more carbon atoms. These waxes 20 are solid at room temperature and have high melting points. Some other examples of long-chain waxes 20 include carnauba wax, candelilla wax, lanolin wax, and paraffin wax. The chemical significance of long-chain waxes 20 lies in their unique properties and characteristics. Long chain waxes are more likely to produce long chain agglomerates after the burn process, and these agglomerates act as flocculants to coalesce other native airborne particles thus enhancing the ability of the burning candle 10 to bind and agglomerate airborne particles. For example, with regards to stability, the long hydrocarbon chains in these waxes 20 provide them with excellent stability, making them resistant to oxidation and degradation. These waxes 20 also aid in facilitating the dissemination of metal nanoparticles 40 into the air 12. These waxes 20 also provide stability, which help in applications where the wax 20 needs to maintain its properties over an extended period (e.g., hours or days). With regards to high melting point, due to the strong intermolecular forces between the long hydrocarbon chains, the long-chain waxes 20 have higher melting points compared to waxes 25, 30. This property makes the long-chain waxes 20 suitable for applications that require the wax 20 to remain solid at higher temperatures.

With regards to hardness, long-chain waxes 20 are generally harder than the medium-chain waxes 25 and short-chain waxes 30, respectively. This material property helps in applications where the wax 20 needs to provide a protective barrier or maintain its shape under pressure. With regards to slow burn rate, in the context of candle 10, the long-chain waxes 20 tend to have a slower burn rate compared to the medium-chain waxes 25 and short-chain waxes 30, respectively. This slower burn rate can help to create a candle 10 that lasts longer and provides a more sustained release of fragrance or other active ingredients. According to the embodiments herein, the long-chain waxes 20, such as hydrogenated jojoba wax, are used in a small proportion (0-15%) to provide structure and stability to the candle 10. These waxes 20 help to ensure a consistent burn and a stable flame, which is helpful for the effective release of the air-purifying compounds from the medium-chain waxes 25.

The medium-chain waxes 25 are waxes that include hydrocarbon chains typically containing between 12-24 carbon atoms. These waxes 25 are usually derived from plant sources and have lower melting points compared to the long-chain waxes 20. The chemical significance of medium-chain waxes 25 is related to their specific properties and characteristics. For example, with regards to lower melting point, due to the shorter hydrocarbon chains, medium-chain waxes 25 have lower melting points and faster burn rates compared to long-chain waxes 20. This property makes these waxes 25 suitable for applications where a lower melting point is desirable, including for producing candle 10. With regards to renewability, the medium-chain waxes 25 may be derived from plant sources, making them a renewable and eco-friendly alternative to petroleum-based waxes. This sustainability aspect is increasingly significant in today's environmentally conscious market.

With regards to versatility, medium-chain waxes 25 can be easily blended with other waxes (e.g., such as long-chain waxes 20 and short-chain waxes 30), oils, or additives to create customized formulations for specific applications. This versatility allows for the development of a candle 10 having tailored properties and performance characteristics. With regards to compatibility with fragrances and additives, medium-chain waxes 25 are compatible with a wide range of fragrances and additives, making them suitable for use in scented candles or other products where the incorporation of active ingredients is desired. With regards to controlled burn rate, the context of candle 10, the medium-chain waxes 25 tend to have a more controlled burn rate compared to short-chain waxes 30. This controlled burn rate allows for a more consistent release of fragrance or other active ingredients over the life of the candle 10. The lower melting point and controlled burn rate of these waxes 25 ensure that the active ingredients are released effectively and consistently, while their renewability and compatibility with additives make them an ideal choice for the innovative air-purifying candle 10.

Short-chain waxes 30 are waxes that comprise hydrocarbon chains typically containing fewer than 16 carbon atoms. These waxes 30 are usually derived from plant sources and have lower melting points and softer textures compared to medium-chain waxes 25 and long-chain waxes 20. Some examples of short-chain waxes 30 include fractionated coconut oil, medium-chain triglyceride (MCT) oil, and some types of vegetable-based waxes. The chemical significance of short-chain waxes 30 is related to their unique properties and characteristics. With regards to very low melting point, due to the short hydrocarbon chains, short-chain waxes 30 have very low melting points compared to medium-chain waxes 25 and long-chain waxes 20. This property makes these waxes 30 suitable for applications where a liquid or semi-solid consistency is desired at room temperature.

With regards to rapid burn rate, in the context of candle 10, short-chain waxes 30 tend to have a rapid burn rate compared to the medium-chain waxes 25 and long-chain waxes 20. This rapid burn rate can be useful in applications where short chain waxes 25 are used to offset the slower burn rate of the medium and long chain wax blend. The short chain waxes 25 serve to tailor the burn rate of the candle 10 maximizing efficacy, lifetime, and stability of the candle 10. With regards to solubility, short-chain waxes 30 are generally more soluble in other oils and waxes compared to medium-chain waxes 25 and long-chain waxes 20. This solubility can be advantageous when creating blends or formulations where a homogeneous mixture is required.

With regards to viscosity modification, when added to other waxes or oils, short-chain waxes 30 can help to modify the viscosity and flow properties of the mixture. This can be useful in adjusting the consistency and behavior of a candle 10 to suit specific application requirements. The short-chain waxes 30 help modulate the burning characteristics of the candle 10, ensuring a clean and efficient burn that maximizes the release of the air-purifying compounds. The rapid burn rate of the short-chain waxes 30, combined with the controlled burn rate of the medium-chain waxes 25 and the stability provided by the long-chain waxes 20, creates an optimal balance that allows the candle 10 to effectively purify the air 12 by neutralizing airborne microorganisms 13.

The airborne microorganisms 13, also known as bioaerosols, are microscopic living organisms that are suspended in the air 12. For example, these microorganisms 12 can include bacteria, viruses, fungi and mold spores, and bacterial spores. Some examples of common airborne microorganisms include bacteria such as *Streptococcus Pneumoniae* (pneumonia), *Mycobacterium tuberculosis* (tuberculosis), and *Legionella pneumophila* (Legionnaires' disease). Some examples of viruses include Influenza viruses (flu), Rhinoviruses (common cold), Measles virus, Varicella-zoster virus (chickenpox and shingles), and SARS-CoV-2 (COVID-19). Some examples of spore forming fungi and mold include *Aspergillus* species (aspergillosis), *Penicillium* species, *Cladosporium* species, *Alternaria* species, and *Cryptococcus neoformans* (cryptococcosis), Stachybotrys chartarum (black mold), and *Cladosporium herbarum*. Some examples of spore forming bacteria include *Bacillus anthracis* (anthrax) and *Clostridium difficile*. These airborne microorganisms 13 can originate from various sources, including humans (e.g., through coughing, sneezing, or talking), animals, soil, water, and decaying organic matter. Some of these microorganisms 13 can cause infectious diseases, allergic reactions, or other health problems when inhaled. Factors such as temperature, humidity, and ventilation can influence the survival and spread of these airborne microorganisms in indoor environments. The innovative wax composition 15 is configured to neutralize various types of airborne microorganisms 13 when the candle 10 is burned, helping to improve indoor air quality and reduce the risk of health issues associated with these bioaerosols and respiratory disease transfer.

The long-chain waxes 20 may be hydrogenated long-chain waxes 20, according to an example. These hydrogenated long-chain waxes 20 provide additional benefits and improvements to the overall performance of the candle 10 in purifying the air 12 and neutralizing airborne microorganisms 13. Hydrogenated long-chain waxes 20 are long-chain waxes that have undergone a chemical hydrogenation process, which involves the addition of hydrogen atoms to the unsaturated bonds of the wax molecules. This process results in a more stable, harder, and higher-melting wax compared to its non-hydrogenated counterparts. The hydrogenation levels in jojoba, soy, coconut, and palm waxes are adjusted to enhance the melting point and hardness, optimizing the burning properties of the candle 10. The inclusion of hydrogenated long-chain waxes 20 in the wax composition 15 provides several improvements to the performance of the candle 10.

First, the hydrogenated long-chain waxes 20 contribute to the overall stability and structure of the candle 10. These waxes 20 have a higher melting point and greater hardness compared to non-hydrogenated waxes, which helps to maintain the shape of the candle 10 and prevent slumping or deformation during storage and burning. This structural integrity ensures that the candle 10 burns evenly and consistently, allowing for the optimal release of the air-purifying compounds from the medium-chain waxes 25.

Second, the hydrogenated long-chain waxes 20 enhance the agglomeration effects of the candle 10. Longer chain waxes 20 tend to undergo incomplete combustion leaving behind charged nucleation points which attract other airborne particulates. These complexes released from the candle 10 act as flocculating agents which are infused with the metal nanoparticles 40. The complexes bind to airborne microbes, and once bound, deactivate and kill the microbe.

Third, the hydrogenated long-chain waxes 20 contribute to the overall burn characteristics of the candle 10. These waxes 20 have a slower burn rate compared to non-hydrogenated waxes, which helps to extend the burn time of the candle 10 and ensure a more gradual release of the air-purifying compounds. This slower burn rate, in combination with the controlled burn rate of the medium-chain waxes 25 and the rapid burn rate of the short-chain waxes 30, creates an optimal balance that maximizes the air-purifying efficiency of the candle 10.

The proportion of hydrogenated long-chain waxes 20 in the wax composition 15 can be adjusted during the manufacturing process based on the desired properties and performance characteristics of the candle 10. The specific amount of hydrogenated long-chain waxes 20 will depend on factors such as the type of wax used, the desired burn time, and the intended application environment. The incorporation of hydrogenated long-chain waxes 20 into the wax composition 15 of the candle 10 represents a significant advancement in the design and performance of air-purifying candles. These waxes 20 contribute to the structural integrity, water resistance, and burn characteristics of the candle 10, ultimately enhancing the ability of the candle 10 to effectively neutralize airborne microorganisms 13 and purify the air 12, especially in indoor environments.

Some examples of hydrogenated long-chain waxes 20 include (i) hydrogenated soy wax, which is made from hydrogenated soybean oil, such that this wax has a higher melting point and greater hardness compared to non-hydrogenated soy wax; (ii) hydrogenated castor wax, which is derived from hydrogenated castor oil, such that this wax has excellent moisture resistance and a high melting point; (iii) hydrogenated jojoba wax, which is obtained from hydrogenated jojoba oil, such that this wax has a high melting point, good stability, and a smooth, creamy texture; and (iv) hydrogenated rapeseed wax, which is produced from hydrogenated rapeseed oil, such that this wax has a high melting point and provides good structural integrity to the candle 10.

The chemical significance of hydrogenated long-chain waxes 20 lies in the changes that occur during the hydrogenation process and the resulting properties. With regards to the saturation of double bonds, during hydrogenation, hydrogen atoms are added to the unsaturated (double) bonds of the long-chain fatty acids in the wax 20. This process converts the unsaturated fatty acids into saturated fatty acids, resulting in a more stable and solid wax 20. With regards to increased melting point, the saturation of double bonds during hydrogenation leads to a higher melting point for the wax 20. This is because the saturated fatty acids have a more linear and tightly packed structure, requiring more energy to disrupt the intermolecular forces and melt the wax 20. With regards to enhanced hardness, hydrogenated long-chain waxes 20 are generally harder than their non-hydrogenated counterparts. The increased saturation and linear structure of the fatty acids allow for stronger intermolecular interactions, resulting in a more rigid and stable wax 20.

With regards to improved moisture resistance, the hydrogenation process reduces the polarity of the wax molecules, making them more hydrophobic thus protecting the metal nanoparticle from oxidation. This increased hydrophobicity enhances the ability of the wax 20 to repel water and moisture, providing better protection against humidity and water damage. With regards to greater stability, hydrogenated long-chain waxes 20 are more resistant to oxidation and degradation compared to non-hydrogenated waxes. The saturation of double bonds eliminates potential sites for oxidative reactions, resulting in a more stable wax that is less prone to rancidity and deterioration over time. These waxes 20 contribute to the structural integrity, moisture resistance, and overall stability of the candle 10, ensuring that the candle 10 performs optimally in releasing the air-purifying compounds and neutralizing airborne microorganisms 13. The higher melting point and hardness of the hydrogenated long-chain waxes 20 also help to control the burn rate and extend the life of the candle 10, making it a more efficient and long-lasting solution for indoor air purification.

The candle 10 further comprises a plurality of metal nanoparticles 40 embedded within the wax composition 15. In an example, the plurality of nanoparticles 40 are less than 50 nm in size and are composed of alloy metals 45. The alloy metals 45 may comprise silver, copper, zinc, or gold alloys, or a combination thereof, according to some examples. Possible oxides that may be utilized include silver oxide, copper oxide, zinc oxide, or magnesium oxide, or a combination thereof, in some other examples. The concentration of the plurality of metal nanoparticles 40 may be in a range of 1 to 50 micrograms of nanoparticles 40 per gram of wax, in an example. Different synthesis methods for nanoparticles 40 can be employed, such as physical vapor deposition or sol-gel processes, to achieve varying shapes, sizes, and surface properties, thereby tailoring the antimicrobial activity of the candle 10. The surface area of the nanoparticles 40 may be a significant factor in the design and selection of the nanoparticles 40 as the efficacy of the candle 10 is directly proportional to the surface area of the nanoparticles 10.

The proportion of the medium-chain waxes 25 and long-chain waxes 20 are selected to enhance the ability of the candle 10 to agglomerate micron and submicron particulates from the treated space (e.g. air 12), including inert and microbial aerosols, and to optimize nanoparticle 40 dissemination. The complete formulation of wax blend serves to aid in nanoparticle 40 release. The proportion of short-chain waxes 30 serves to control burn rate, which controls the overall efficacy and clean air delivery rate of the candle 10.

The plurality of nanoparticles 40 are ultra-small particles with sizes ranging from 1 to 100 nanometers (nm) in at least one dimension, and can have various structures, such as spherical, rod-like, or irregular shapes. Each of the plurality of nanoparticles 40 may have a core-shell structure, with a metal core and a protective or functional coating, and can be formed through various methods, including chemical synthesis, physical vapor deposition, or biological processes. The plurality of nanoparticles 40 exhibit unique physical, chemical, and optical properties that are dependent on their size, shape, and composition.

The inclusion of the plurality of nanoparticles 40 allows the air-purifying candle 10 to incorporate a novel and innovative feature that further enhances the ability of the candle 10 to neutralize airborne microorganisms 13 and purify the air 12. The metal nanoparticles 40 provide a highly effective means of neutralizing airborne microorganisms 13 through their unique properties and interactions at the nanoscale level. These nanoparticles 40 are incredibly small, with sizes less than 50 nanometers (nm), which allows them to have a high surface area to volume ratio and enhanced reactivity compared to larger particles.

The metal nanoparticles 40 are composed of alloy metals 45, which are a combination of one, two, or more metallic elements. As mentioned, the alloy metals 45 used in the candle 10 may include silver, copper, zinc, or gold alloys, or a combination thereof. Each of these alloy metals 45 has specific properties that contribute to the overall effectiveness of the metal nanoparticles 40 in neutralizing airborne microorganisms 13.

Silver alloys, for example, have antimicrobial properties that can be used to prevent the growth of bacteria and other microorganisms. Copper alloys also possess antimicrobial properties and can effectively inactivate various types of bacteria, viruses, and fungi. Zinc alloys have been shown to have antiviral and antibacterial effects, while gold alloys have been studied for their potential to inhibit the growth of certain microorganisms.

The concentration of the metal nanoparticles 40 within the wax composition 15 is carefully controlled to ensure optimal performance and safety. In an example, the concentration of the metal nanoparticles 40 may be in the range of 1 to 50 micrograms of nanoparticles 40 per gram of wax. This concentration range allows for the effective neutralization of airborne microorganisms 13 while maintaining the stability and burn characteristics of the candle 10.

When the candle 10 is burned, the heat from the flame gradually melts the wax composition 15, releasing the embedded metal nanoparticles 40 into the air 12 along with the air-purifying compounds from the medium-chain waxes 25. As the metal nanoparticles 40 come into contact with airborne microorganisms 13, they interact with the cell membranes, proteins, and genetic material of the microorganisms 13, disrupting their structure and function. This interaction leads to the neutralization of the airborne microorganisms 13, effectively purifying the air 12 in the surrounding environment.

The incorporation of metal nanoparticles 40 composed of alloy metals 45 into the wax composition 15 of the candle 10 represents a groundbreaking advancement in the field of air purification. By harnessing the power of nanotechnology and the antimicrobial properties of specific alloy metals 45, the candle 10 provides a highly efficient and innovative solution for neutralizing airborne microorganisms 13 and improving indoor air quality. This unique combination of a carefully formulated wax composition 15 and the inclusion of metal nanoparticles 40 sets the candle 10 apart as a cutting-edge and highly effective air-purifying solution.

Beyond silver, copper, zinc and gold alloys, other non-toxic metals known for their antimicrobial properties, like zinc and titanium, can be explored for their suitability as nanoparticle materials in the candle 10. Moreover, a blend of different metal nanoparticles 40 can be investigated for synergistic effects in air purification. This might include a combination of silver and zinc nanoparticles, each offering unique antimicrobial properties. Furthermore, as described below, the nanoparticles 40 may coated with biocompatible materials 75 or functionalized with specific chemical groups 80 can be used to enhance stability, control release rates, and tailor interactions with airborne pathogens. These alternate methods and variations provide a broad scope of alternative configurations for the candle 10, ensuring its adaptability and effectiveness in various settings.

Figure 2A:
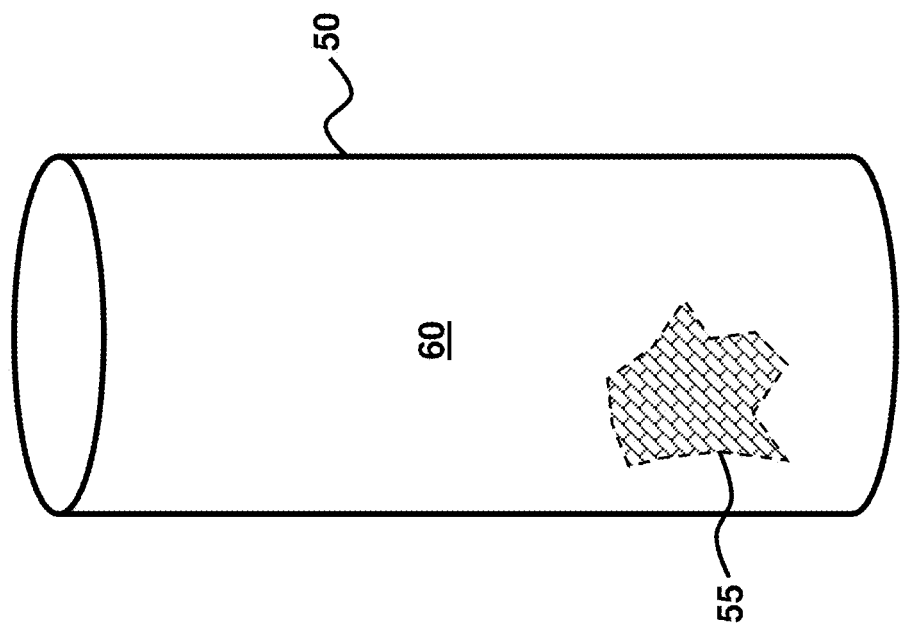
FIG. 2A is a schematic diagram illustrating aspects of the wick of the candle of FIG. 1, according to an embodiment herein.

The candle 10 further comprises a wick 50 for burning the wax composition 15. In an example, the composition of the wax of the wick 50 may be different from the wax composition 15. FIGS. 2A and 2B, with reference to FIG. 1, illustrate that the wick 50 may comprise a natural fiber core, such as cotton, bamboo or hemp, 55, which may be braided, and a coating 60 comprising wax. The wick 50 is a carefully designed component that facilitates the controlled and consistent burning of the candle 10, allowing for the optimal release of the air-purifying compounds and metal nanoparticles 40 into the surrounding environment. In an example, the composition of the wax used in the wick 50 may be different from the wax composition 15 of the candle 10. This strategic choice of using a different wax composition for the wick 50 offers several distinctions that enhance the overall performance and effectiveness of the candle 10 in purifying the air 12.

The wick 50 may be composed of a wax that has a higher melting point compared to the wax composition 15 of the candle 10. This higher melting point allows the wick 50 to maintain its structural integrity and shape during the burning process, preventing the wick 50 from becoming too soft or collapsing into the molten wax pool of the candle 10. By maintaining its structure, the wick 50 ensures a consistent and controlled burn, which is essential for the efficient release of the air-purifying compounds and metal nanoparticles 40.

Moreover, the composition of the wick 50 may be formulated to have a slower burn rate compared to the wax composition 15 of the candle 10. This slower burn rate helps to regulate the overall burn speed of the candle 10, preventing the candle 10 from burning too quickly or unevenly. By controlling the burn rate, the wick 50 ensures that the air-purifying compounds and metal nanoparticles 40 are released at a steady and optimized pace, maximizing their effectiveness in neutralizing airborne microorganisms 13. The composition of the wick 50 may also be designed to minimize the production of soot and other undesirable byproducts during the burning process. By selecting a wax composition that burns cleanly and efficiently, the wick 50 helps to maintain the purity of the air-purifying compounds and metal nanoparticles 40 released into the air 12. This clean-burning property of the wick 50 also contributes to the overall safety and environmental friendliness of the candle 10.

In addition to its functional properties, the wick 50 may also be treated or infused with additional substances that enhance the air-purifying capabilities of the candle 10. For example, the wick 50 may be treated with antimicrobial agents or other active ingredients that complement the action of the metal nanoparticles 40 and the air-purifying compounds released from the wax composition 15. These additional substances can further boost the effectiveness of the candle 10 in neutralizing a wide range of airborne microorganisms 13.

The choice of materials used in the construction of the wick 50 is also carefully considered to ensure optimal performance and safety. The wick 50 may be made from natural or synthetic fibers that are heat-resistant, durable, and capable of effectively drawing the molten wax up to the flame. Common materials used for candle wicks include cotton, linen, paper, or specialized synthetic fibers that are designed to meet the specific requirements of the candle 10.

The wick 50 of the candle 10 is configured to optimize the burning process and enhance the air-purifying capabilities of the candle 10. The wick 50 comprises a braided cotton core 55 and a coating 60 that is composed of wax. This unique combination of materials and construction techniques results in a wick 50 that delivers superior performance, consistency, and safety to the use of the candle 10. The braided cotton core 55 forms the central structure of the wick 50. For example, cotton may be selected as the primary material for the core 55 due to its excellent wicking properties, which allow it to efficiently draw the molten wax from the pool of the candle 10 up to the flame. The braided structure of the cotton core 55 provides several distinctions over traditional twisted or knitted wicks.

First, the braided cotton core 55 offers increased surface area compared to other wick structures. This larger surface area allows for better capillary action, enabling the wick 50 to draw up more molten wax at a consistent rate. The improved wicking efficiency of the braided cotton core 55 ensures a steady fuel supply to the flame, resulting in a more stable and consistent burn throughout the life of the candle 10. Second, the braided structure of the cotton core 55 provides enhanced mechanical stability to the wick 50. The interlocking strands of the braid create a stronger and more resilient structure that is less prone to breakage or collapse during the burning process. This structural integrity is crucial for maintaining a consistent flame height and preventing the wick 50 from becoming submerged in the molten wax pool, which can lead to incomplete combustion and reduced air-purifying efficiency.

To further enhance the performance and burning characteristics of the wick 50, a coating 60 comprising wax is applied to the braided cotton core 55. This wax coating 60 serves multiple purposes that contribute to the overall effectiveness and safety of the candle 10. The wax coating 60 acts as a protective layer for the braided cotton core 55, shielding it from direct exposure to the high temperatures of the flame. This protective function helps to prevent the cotton fibers from charring or burning too quickly, which can lead to uneven burning or premature wick failure. By extending the life of the wick 50, the wax coating 60 ensures that the candle 10 can continue to release the air-purifying compounds and metal nanoparticles 40 effectively throughout its intended burn time.

Moreover, the wax coating 60 plays a role in regulating the burn rate of the wick 50. By carefully selecting the composition and thickness of the wax coating, the burn rate can be fine-tuned to achieve the desired balance between the release of air-purifying compounds and the overall longevity of the candle 10. A well-controlled burn rate is essential for maintaining the optimal concentration of metal nanoparticles 40 and other active ingredients in the air 12, ensuring consistent and effective air purification. The wax used in the coating 60 may be specifically formulated to complement the wax composition 15 of the candle 10. This formulation can include additives or modifiers that enhance the burning properties, such as improved melt pool stability, reduced soot formation, and consistent flame size. By optimizing the wax coating 60, the overall performance and aesthetic appeal of the candle 10 can be further enhanced.

The braided structure of the cotton core 55 provides improved wicking efficiency and mechanical stability, while the wax coating 60 offers protection, burn rate regulation, and performance enhancement. This innovative aspect of the wick 50 ensures that the candle 10 can effectively release the air-purifying compounds and metal nanoparticles 40 into the air 12, neutralizing airborne microorganisms 13 and improving indoor air quality. The careful selection of materials and construction techniques used in the wick 50 helps create a highly effective and reliable air-purifying candle 10.

Accordingly, the wick 50 of the candle 10 is a meticulously designed component that plays a vital role in the efficient and effective air purification process. By utilizing a different wax composition compared to the wax composition 15 of the candle 10, the wick 50 ensures a consistent, controlled, and clean burn, allowing for the optimal release of the air-purifying compounds and metal nanoparticles 40. The strategic choice of materials, treatments, and design elements of the wick 50 contributes to the overall performance, safety, and environmental friendliness of the candle 10, making it a highly advanced and innovative solution for improving indoor air quality by neutralizing airborne microorganisms 13.

FIGS. 3A and 3B, with reference to FIGS. 1 through 2B, illustrate that the candle 10 may comprise metal nanowires or nanofibers 65 integrated into the wick 50. Further enhancements to the efficacy of the candle 10 could incorporate metal nanoparticles or nanowires composed of silver, copper or gold as a method to disseminate ionized metal nanoparticles 40 into the environment without the need to infuse the nanoparticles 40 directly into the wax composition 15. In some examples, the metal nanowires or nanofibers 65 may be composed of silver, copper, or zinc, or a combination thereof. According to an example, the metal nanowires or nanofibers or nanopowders 65, such as silver, copper, or zinc may generate additional metal nanoparticles 40x during burning. Accordingly, these metal nanowires or nanofibers 65 are strategically integrated into the structure of the wick 50 to enhance the ability of the candle 10 to generate additional metal nanoparticles 40x during the burning process, further amplifying the air-purifying capabilities and effectiveness of the candle 10 in neutralizing airborne microorganisms 13. When the candle 10 burns, these metals 65 would generate nanoparticles 40x directly in the flame, offering a continuous release of antimicrobial agents. This method could enhance the overall efficacy of the candle 10 in air purification.

The metal nanowires or nanofibers 65 are carefully selected based on their composition and unique properties. In some examples, these nanowires or nanofibers 65 may be composed of silver, copper, or zinc, or a combination thereof. Silver nanowires or nanofibers, for instance, are advantageous to use due to their potent antimicrobial effects. When exposed to the flame during the burning process, silver nanowires or nanofibers release silver ions, which are known to interfere with the cellular processes of microorganisms. These silver ions can disrupt the bacterial cell membrane, inhibit enzyme activity, and interfere with DNA replication, ultimately leading to the inactivation or death of the microorganisms 13. The incorporation of silver nanowires or nanofibers into the wick 50 ensures a continuous release of silver ions throughout the burning process, providing a sustained and effective antimicrobial action.

Similarly, copper nanowires or nanofibers have demonstrated remarkable antimicrobial activity against a wide spectrum of bacteria, viruses, and fungi. Copper ions released from the nanowires or nanofibers can damage the cell membrane of microorganisms, disrupt their metabolic processes, and cause oxidative stress, effectively neutralizing them. The inclusion of copper nanowires or nanofibers in the wick 50 enhances the ability of the candle 10 to combat a broad range of airborne microorganisms 13, making it a comprehensive air-purifying solution.

Zinc nanowires or nanofibers have also shown promising antimicrobial properties. Zinc ions released from these nanostructures can interfere with the growth and reproduction of microorganisms by disrupting their enzymatic activities and cellular processes. The incorporation of zinc nanowires or nanofibers into the wick 50 further expands the antimicrobial spectrum of the candle 10, ensuring its effectiveness against a diverse range of airborne pathogens.

The integration of metal nanowires or nanofibers 65 into the wick 50 is a precise and meticulous process. These nanowires or nanofibers 65 may be seamlessly woven into the braided cotton core 55 of the wick 50, ensuring their uniform distribution throughout the structure of the wick 50. Alternatively, the metal nanowires or nanofibers 65 may be incorporated into the wax coating 60 that surrounds the braided cotton core 55. By strategically positioning the metal nanowires or nanofibers 65 within or integrated into the wick 50, their exposure to the flame and the molten wax pool is optimized, facilitating the efficient generation of additional metal nanoparticles 40*x* during the burning process.

According to an example, when the candle 10 is lit, the high temperature of the flame not only melts the wax composition 15, releasing the embedded metal nanoparticles 40, but also interacts with the metal nanowires or nanofibers 65 present in the wick 50. The intense heat causes the metal nanowires or nanofibers 65 to undergo thermal decomposition or vaporization, a process in which the nanostructures break down into smaller particles, forming additional metal nanoparticles 40*x*.

These newly generated metal nanoparticles 40*x* are released into the air alongside the metal nanoparticles 40 already present in the wax composition 15. The continuous generation of metal nanoparticles 40*x* throughout the burning process significantly increases the concentration of antimicrobial agents in the air 12, enhancing the overall air-purifying efficiency of the candle 10. The synergistic effect of the metal nanoparticles 40 from the wax composition 15 and the additional metal nanoparticles 40*x* generated from the nanowires or nanofibers 65 creates a highly potent and comprehensive antimicrobial environment, effectively neutralizing a wide range of airborne microorganisms 13.

The size, composition, and release rate of the metal nanoparticles 40*x* generated from the nanowires or nanofibers 65 can be precisely controlled by adjusting various parameters, such as the diameter, length, and material of the nanowires or nanofibers 65. This allows for the fine-tuning of the air-purifying performance of the candle 10, ensuring optimal effectiveness against specific types of microorganisms 13 or adapting to different environmental conditions. Accordingly, by generating additional metal nanoparticles 40*x* during the burning process, the candle 10 achieves a higher concentration of antimicrobial agents in the air 12, leading to enhanced neutralization of airborne microorganisms 13. The selection of metals such as silver, copper, or zinc for the nanowires or nanofibers 65 further amplifies the air-purifying capabilities of the candle 10, providing a comprehensive and highly effective solution for improving indoor air quality.

FIG. 4, with reference to FIGS. 1 through 3B, illustrates that the candle 10 may comprise functional additives 70 blended with the wax composition 15. These functional additives 70 are specifically selected for their potent antimicrobial properties and their ability to work synergistically with the other components of the candle 10, such as the metal nanoparticles 40 and the metal nanowires or nanofibers 65 integrated into the wick 50.

The wax composition 15 can be tailored by varying the ratios of long-chain waxes 20 and medium-chain carbon waxes 25. This modification aims to enhance the particle agglomeration effects, which is crucial for the air purification capability of the candle 10. Adjusting the proportion of hydrogenated long-chain waxes 20, like jojoba wax, in combination with medium-chain vegetable waxes 25 (such as soy, coconut, palm, apricot, or other naturally derived oils and waxes), can optimize the particle agglomeration effect. These variations allow for fine-tuning the burn characteristics of the candle 10, including burn rate, melting point, and the release dynamics of the embedded nanoparticles 40, thereby enhancing the overall air-purifying effectiveness of the candle 10.

In addition to the primary wax composition 15 and nanoparticle 40 addition, functional additives 70 can be incorporated into the candle 10 to boost its efficacy against airborne microorganisms 13. These additives 70 might include natural essential oils, terpenes or other natural compounds known for their antimicrobial properties, which could synergize with the formulation to enhance the ability of the candle 10 to neutralize pathogens in the air 12. These additives 70 could also serve to improve the aesthetic and sensory appeal of the candle 10, such as through fragrance, without detracting from its primary function of air purification. The inclusion of these additives 70 offers a dual benefit: enriching the user experience while bolstering the effectiveness of the candle 10 in combating airborne contaminants. By exploring these variations in the wax composition 15 and functional additives 70, the candle 10 can be adapted to different environments and user preferences, enhancing its market appeal and utility as an innovative air purification solution.

In some examples, the functional additives 70 may comprise essential oils, terpenes, and other natural antimicrobial compounds, or a combination thereof. These natural substances are suitable for use due to their remarkable ability to inhibit the growth and survival of a wide range of microorganisms 13, including bacteria, viruses, and fungi.

Essential oils are highly concentrated, volatile plant extracts that contain a complex mixture of bioactive compounds. Many essential oils, such as tea tree oil, eucalyptus oil, lavender oil, and thyme oil, have demonstrated potent antimicrobial activity. These oils can disrupt the cell membrane of microorganisms 13, interfere with their metabolic processes, and inhibit their ability to reproduce, effectively neutralizing them. The incorporation of essential oils as functional additives 70 in the wax composition 15 of the candle 10 provides an additional layer of antimicrobial protection, enhancing the overall air-purifying capabilities of the candle 10.

Terpenes are another class of natural compounds that have remarkable antimicrobial properties. These organic compounds are commonly found in plants and are responsible for the distinctive aromas and flavors of many essential oils. Some examples of terpenes with antimicrobial activity include limonene, pinene, and carvacrol. These compounds can penetrate the cell membrane of microorganisms, disrupting their structure and function, and ultimately leading to their inactivation. The inclusion of terpenes as functional additives 70 in the wax composition 15 further amplifies the ability of the candle 10 to combat airborne microorganisms 13.

Other natural antimicrobial compounds, such as phenolic compounds, flavonoids, and alkaloids, may also be incorporated as functional additives 70 in the wax composition 15. These compounds have been identified in various plant extracts and have demonstrated significant antimicrobial activity against a broad spectrum of pathogens. By carefully selecting and blending these natural antimicrobial compounds into the wax composition 15, the candle 10 can achieve a comprehensive and highly effective air-purifying action.

The incorporation of functional additives 70 into the wax composition 15 requires careful consideration of their compatibility with the other components of the candle 10. The selection of specific essential oils, terpenes, and other natural antimicrobial compounds is based on their proven efficacy, stability, and potential synergistic effects. The concentration of these functional additives 70 is precisely controlled to ensure optimal antimicrobial activity without compromising the burning performance or the structural integrity of the candle 10.

When the candle 10 is lit, the heat from the flame 51 gradually melts the wax composition 15, releasing the functional additives 70 along with the metal nanoparticles 40 into the surrounding air 12. As the essential oils, terpenes, and other natural antimicrobial compounds diffuse through the air, they create a protective barrier against airborne microorganisms 13. The volatile nature of these compounds allows them to penetrate and neutralize microorganisms 13 effectively, providing an additional level of air purification.

The synergistic effect of the functional additives 70 with the metal nanoparticles 40 and the metal nanowires or nanofibers 65 in the wick 50 creates a highly potent and comprehensive antimicrobial environment. The combined action of these components targets a wide range of microorganisms through multiple mechanisms, ensuring a thorough and efficient air purification process.

Moreover, the release of essential oils and other natural compounds from the candle 10 can provide additional benefits beyond air purification. Many of these substances are known for their aromatherapeutic properties, promoting relaxation, reducing stress, and enhancing overall well-being. The carefully selected functional additives 70 can create a pleasant and soothing ambiance, making the candle 10 not only an effective air-purifying device but also a means to promote a healthy and rejuvenating indoor environment. Accordingly, the release of the functional additives 70 during the burning process provides an additional layer of protection against airborne microorganisms 13, while also offering potential aromatherapeutic benefits.

In another embodiment, metal ions 41 may be released from the candle 10 into the air 12 when the candle 10 is burned. Metal ions 41 and nanoparticles 40, 40*x* are both forms of metals, but they have distinct differences in their structure, size, and properties. Metal ions 41 are positively charged atoms or molecules that have lost one or more electrons from their outer shell. Metal ions 41 are typically smaller than nanoparticles 40, with sizes in the range of a few angstroms (Å) to a few nanometers (nm). Metal ions 41 exist as individual charged species in solution or as part of ionic compounds and are formed when metals lose electrons through processes such as oxidation, dissolution, or ionization. Metal ions 41 are highly reactive due to their positive charge and can readily participate in chemical reactions, such as forming complexes with other molecules or undergoing reduction. Some example metal ions include sodium ($Na+$), potassium ($K+$), calcium ($Ca2+$), and transition metal ions like copper ($Cu2+$), zinc ($Zn2+$), and silver ($Ag+$).

The metal ions 41 are smaller than nanoparticles 40, 40*x*, with sizes typically below a few nanometers, while nanoparticles 40, 40*x* have sizes ranging from 1 to 100 nm. Moreover, the metal ions 41 exist as individual charged species, while nanoparticles 40, 40*x* have a defined structure and can have a core-shell arrangement. Furthermore, the metal ions 41 are highly reactive due to their positive charge, while the reactivity of the nanoparticles 40, 40*x* is influenced by their size, shape, and surface properties. The metal ions 41 have properties based on their charge and interactions with other molecules, while nanoparticles 40, 40*x* exhibit unique size- and shape-dependent properties.

In the context of the air-purifying candle 10, both metal ions 41 and metal nanoparticles 40, 40*x* play unique roles. The metal nanoparticles 40 embedded in the wax composition 15 are released during the burning process and can interact directly with airborne microorganisms 13. Additionally, the high temperature of the flame 51 causes the metal nanoparticles 40 to vaporize and release metal ions 41, such as silver ions ($Ag+$), copper ions ($Cu2+$), or zinc ions ($Zn2+$). These metal ions 41 may be the primary active species responsible for neutralizing the microorganisms 13 by disrupting their cellular functions. The combination of metal nanoparticles 40 and the released metal ions 41 creates a synergistic effect, enhancing the overall air purification efficiency of the candle 10.

FIG. 5, with reference to FIGS. 1 through 4, illustrates that the nanoparticles 40 may be coated with biocompatible materials 75 or functionalized with a hydroxyl or carboxyl-based group 80. These modifications to the nanoparticles 40 not only improve their stability and dispersion within the wax composition 15 but also augment their ability to neutralize airborne microorganisms 13 effectively. The coating of the nanoparticles 40 with biocompatible materials 75 enhances the functionality and safety of the candle 10. Biocompatible materials 75 are substances that can interact with biological systems without causing adverse effects or eliciting an immune response. Some examples of biocompatible materials 75 that may be used to coat the nanoparticles 40 include natural polymers such as chitosan, alginate, or cellulose derivatives, as well as synthetic polymers like polyethylene glycol (PEG) or polylactic acid (PLA).

The coating process involves the controlled deposition of the biocompatible material 75 onto the surface of the nanoparticles 40. This can be achieved through various methods, such as adsorption, covalent bonding, or encapsulation, depending on the specific properties of the nanoparticles 40 and the chosen biocompatible material 75. The coating thickness and uniformity are carefully controlled to ensure optimal performance and stability of the nanoparticles 40.

The presence of the biocompatible coating 75 on the nanoparticles 40 offers several distinctions. First, it enhances the dispersion and stability of the nanoparticles 40 within the wax composition 15. The coating prevents the agglomeration of the nanoparticles 40, ensuring that they remain evenly distributed throughout the candle 10. This uniform dispersion is crucial for the effective release of the nanoparticles 40 during the burning process and their efficient interaction with airborne microorganisms 13. Second, the biocompatible coating 75 can improve the antimicrobial activity of the nanoparticles 40. Certain biocompatible materials, such as chitosan, have inherent antimicrobial properties that can work synergistically with the metal nanoparticles 40 to enhance their ability to neutralize microorganisms. The biocompatible coating 75 can also facilitate the controlled release of metal ions from the nanoparticles 40, prolonging their antimicrobial action and maximizing their efficiency. Third, the biocompatible coating 75 enhances the safety profile of the nanoparticles 40. By encapsulating the nanoparticles 40 with a biocompatible material, the potential for any adverse interactions with human cells or the environment is minimized. This is particularly important considering the release of the nanoparticles 40 into the air during the burning process of the candle 10.

In addition to the biocompatible coating 75, the nanoparticles 40 may also be functionalized with a hydroxyl or carboxyl-based group 80. Functionalization refers to the attachment of specific chemical groups or molecules to the surface of the nanoparticles 40 to impart desired properties or reactivity. The hydroxyl (—OH) and carboxyl (—COOH) groups are commonly used for functionalization due to their versatility and compatibility with various biological systems. The functionalization of the nanoparticles 40 with hydroxyl or carboxyl-based groups 80 can be achieved through various chemical reactions, such as silanization, esterification, or carbodiimide coupling. The choice of the specific functional group and the functionalization method depends on the surface chemistry of the nanoparticles 40 and the desired outcomes. Hydroxyl is present in alcohols and phenolic compounds, and the hydroxyl groups can disrupt cell membranes and are known for their disinfectant properties. Carboxyl is found in carboxylic acids and can disrupt microbial cell walls and interfere with metabolic processes.

The presence of hydroxyl or carboxyl-based groups 80 on the surface of the nanoparticles 40 offers several distinctions. First, these functional groups enhance the hydrophilicity of the nanoparticles 40, improving their dispersion and stability in the wax composition 15. The increased hydrophilicity also facilitates the interaction of the nanoparticles 40 with airborne microorganisms 13, as many microorganisms have hydrophilic surfaces. Second, the hydroxyl or carboxyl-based groups 80 can serve as anchoring points for the attachment of additional antimicrobial agents or biomolecules. For example, the functional groups can be used to conjugate antibodies, enzymes, or other bioactive compounds that can further enhance the antimicrobial activity of the nanoparticles 40. This versatility allows for the customization of the nanoparticles 40 to target specific microorganisms or adapt to different environmental conditions. Third, the functionalization of the nanoparticles 40 with hydroxyl or carboxyl-based groups 80 can improve their biocompatibility and reduce any potential toxicity. These functional groups are commonly found in biological systems and are well-tolerated by human cells. The presence of these groups on the surface of the nanoparticles 40 can help to minimize any adverse interactions and ensure the safety of the candle 10 during use.

The combination of the biocompatible coating 75 and the functionalization with hydroxyl or carboxyl-based groups 80 creates a highly sophisticated and efficient antimicrobial system within the candle 10. The synergistic effect of these modifications enhances the stability, dispersion, and antimicrobial activity of the nanoparticles 40, while also improving their safety profile. The controlled release of the functionalized and coated nanoparticles 40 during the burning process of the candle 10 ensures a prolonged and effective air purification action, neutralizing a wide range of airborne microorganisms 13.

Accordingly, the coating of the nanoparticles 40 with biocompatible materials 75 and the functionalization with hydroxyl or carboxyl-based groups 80 represent significant advancements in the design and performance of the candle 10 as an air purification mechanism. These strategic modifications enhance the stability, antimicrobial activity, and safety of the nanoparticles 40, ensuring their optimal performance in neutralizing airborne microorganisms 13. The combination of these advanced features with the carefully formulated wax composition 15, the engineered wick 50, and the incorporation of functional additives 70 positions the candle 10 as a state-of-the-art solution for creating a healthier and safer indoor environment.

FIG. 6, with reference to FIGS. 1 through 5, is a flowchart illustrating a method 100 for air purification. The method 100 comprises providing (105) a candle 10 comprising a wax composition 15, wherein the wax composition 15 comprises a blend of long-chain waxes 20, medium-chain waxes 25, and short-chain waxes 30, wherein the long-chain waxes 20 are present in an amount of 0-15% of a total composition of the wax composition 15, the medium-chain waxes 25 are present in an amount of 60-100% of the total composition of the wax composition 15, and the short-chain waxes 30 are present in an amount of 0-15% of the total composition of the wax composition 15; hydrogenated long-chain waxes 20; a plurality of metal nanoparticles 40 embedded within the wax composition 15, wherein the plurality of nanoparticles 40 are less than 50 nm in size and are composed of alloy metals 45; and a wick 50 for burning the wax composition 15. The method 100 further comprises burning (110) the candle 10 to release the plurality of metal nanoparticles 40 and metal ions into the air 12.

In the providing step (105), the candle 10 comprises several components utilized for its air purification function. The candle 10 is constructed with a wax composition 15 that serves as the foundation for the air-purifying agents. The wax composition 15 is a precisely formulated blend of long-chain waxes 20, medium-chain waxes 25, and short-chain waxes 30. The proportions of these waxes are selectively balanced to optimize the burning characteristics of the candle 10 and the release of the air-purifying agents. The long-chain waxes 20 are present in an amount of 0-15% of the total composition of the wax composition 15. These waxes, such as hydrogenated soy wax or beeswax, provide structure and stability to the candle 10, ensuring a consistent burn and a stable flame 51. The medium-chain waxes 25, which may include soy wax, coconut wax, or palm wax, constitute the majority of the wax composition 15, ranging from 60-100% of the total composition. These medium-chain waxes 25 are utilized for the controlled release of the air-purifying agents during the burning process. The short-chain waxes 30, for example, fractionated coconut oil or MCT oil, are present in an amount of 0-15% of the total composition. These waxes 30 help to modulate the burning characteristics of the candle 10, ensuring a clean and efficient burn.

In addition to the blend of waxes 20, 25, 30, the wax composition 15 also includes hydrogenated long-chain waxes 20. These waxes, such as hydrogenated castor wax or hydrogenated jojoba wax, are selected for their high melting points and excellent stability. The incorporation of hydrogenated long-chain waxes 20 enhances the structural integrity of the candle 10 and helps to control the release rate of the air-purifying agents. Furthermore, embedded within the wax composition 15 are a plurality of metal nanoparticles 40. These nanoparticles 40 aid in the air purification function of the candle 10. The metal nanoparticles 40 are less than 50 nm in size, which provides them with a high surface area to volume ratio, enhancing their reactivity and effectiveness in neutralizing airborne microorganisms 13. The nanoparticles 40 are composed of alloy metals 45, such as silver-copper alloys or zinc-copper alloys, which are selected for their potent antimicrobial properties. The combination of different alloy metals 45 creates a synergistic effect, increasing the efficacy of the nanoparticles 40 in eliminating a wide range of microorganisms 13.

With carbon chain lengths of C38-C44, the hydrogenated long-chain waxes 20 provide a stable matrix for nanoparticle 40 incorporation and controlled release during burning. The bulk of the candle 10 (60-100%) is made of medium-chain (C16-C20) vegetable waxes 25 such as soy, coconut, palm, and newer additions like olive and apricot waxes. These are chosen for their favorable burn characteristics and compatibility with nanoparticles 40. Accounting for 0-15% of the composition, the short-chain (<C16) waxes 30 are derived from sources like soy and coconut or other organic sources containing short chain oils or waxes. The short chain oils and waxes are crucial for fine-tuning the burn rate and melting point of the candle 10 to achieve efficacy.

The candle 10 also features a wick 50 that is essential for burning the wax composition 15 and releasing the air-purifying agents. The wick 50 is configured to ensure an optimal burn rate and a consistent flame 51. The material and structure of the wick 50 are selected to minimize soot formation and ensure a clean burn, preventing any unwanted pollutants from being released into the air 12.

Nanoparticles 40 of metals like silver, copper, zinc and gold alloys, known for their antibacterial and virucidal properties, are used in the method 100. These nanoparticles 40 are less than 50 nm in size, with most in the sub-30 nm range. These metals have low toxicity and are known to be highly efficacious antimicrobials at extremely low concentrations. In an example, the primary component of the nanoparticles 40 used is silver. Particle size is carefully controlled and verified using techniques like Dynamic Light Scattering (DLS) to ensure efficacy. Efficacy has been shown to be directly proportional to the surfaces area of the nanoparticle 40. Thus, sub 30 nm particle are desired.

In the burning (110) step, the wick 50 of the candle 10 is lit with a flame 51 which allows the candle 10 to burn in order to release the plurality of metal nanoparticles 40 as well as metal ions 41 into the air 12. When the candle 10 is lit, the heat from the flame 51 melts the wax composition 15 around the wick 50. As the wax melts, the embedded metal nanoparticles 40 are released into the molten wax pool.

The high temperature of the flame 51 causes the metal nanoparticles 40 to vaporize and release metal ions 41 into the surrounding air 12. These metal ions 41, such as silver ions ($Ag+$), copper ions ($Cu2+$), or zinc ions ($Zn2+$), are the active species responsible for neutralizing airborne microorganisms 13. The metal ions 41 interact with the cell membranes, proteins, and genetic material of the microorganisms, disrupting their normal functions and rendering them inactive.

As the candle 10 continues to burn, the wax composition 15 is gradually consumed, releasing a steady stream of metal nanoparticles 40 and metal ions into the air 12. The controlled release of these air-purifying agents ensures a continuous and effective air purification process throughout the burning duration of the candle 10.

The burning process also releases any fragrances and other beneficial compounds such as functional additives 70 present in the wax composition 15, such as essential oils or natural extracts. These functional additives 70 not only provide a pleasant aroma but also contribute to the overall air purification effect by creating a soothing and relaxing atmosphere. As the candle 10 burns down, the wick 50 is consumed along with the wax composition 15. The wick 50 ensures a consistent and controlled burn, preventing any sudden flare-ups or uneven burning that could affect the release of the air-purifying agents. The burning process continues until the candle 10 is extinguished or the wax composition 15 is fully consumed. During this time, the released metal nanoparticles 40 and metal ions 41 continuously work to purify the air 12, neutralizing airborne microorganisms 13 and improving the overall air quality in the surrounding environment.

The released nanoparticles 40 may agglomerate and neutralize airborne microorganisms 13. When the candle 10 is burned, the heat from the flame 51 melts the wax composition 15, leading to the release of the embedded metal nanoparticles 40 into the surrounding air 12. These released nanoparticles 40 play a crucial role in the air purification process by neutralizing airborne microorganisms 13 through various mechanisms, including agglomeration.

Agglomeration is a process in which the released metal nanoparticles 40 come together and form larger clusters or aggregates. This phenomenon is driven by the high surface energy of the nanoparticles 40, which makes them inherently unstable and prone to minimizing their surface area by adhering to one another. The agglomeration of the metal nanoparticles 40 in the air 12 has significant implications for their interaction with airborne microorganisms 13 and the overall effectiveness of the air purification process.

As the metal nanoparticles 40 agglomerate, they create a network of interconnected particles with a larger effective size. This increased size of the agglomerated nanoparticles 40 enhances their chances of encountering and interacting with airborne microorganisms 13. The larger surface area of the agglomerated nanoparticles 40 provides more opportunities for contact with the microorganisms 13, facilitating their neutralization.

When the agglomerated metal nanoparticles 40 come into contact with airborne microorganisms 13, several mechanisms of neutralization can occur. First, the nanoparticles 40 can physically adsorb onto the surface of the microorganisms 13, disrupting their cell membranes and interfering with their normal functions. The adsorption process is facilitated by the high surface energy and reactivity of the nanoparticles 40, which allows them to establish strong interactions with the cell walls or membranes of the microorganisms 13. Second, the agglomerated metal nanoparticles 40 can release metal ions 41, such as silver ions (Ag+), copper ions (Cu2+), or zinc ions (Zn2+), in the vicinity of the microorganisms. These metal ions 41 are highly reactive and can penetrate the cell membranes of the microorganisms 13, causing oxidative stress, disrupting metabolic processes, and damaging essential cellular components like proteins and DNA. The release of metal ions 41 from the agglomerated nanoparticles 40 creates a localized high concentration of antimicrobial agents, enhancing their effectiveness in neutralizing the airborne microorganisms 13.

Furthermore, the agglomerated metal nanoparticles 40 can catalyze the generation of reactive oxygen species (ROS), such as hydroxyl radicals (OH·), superoxide anions (O2·−), and hydrogen peroxide ($H_2O_2$), in the presence of air 12 and moisture. These ROS are highly oxidizing and can damage the cell membranes, proteins, and genetic material of the microorganisms 13, leading to their inactivation or death. The catalytic properties of the agglomerated nanoparticles 40 amplify the production of ROS, creating a highly antimicrobial environment in the surrounding air 12.

The agglomeration of the released metal nanoparticles 40 also enhances their stability and prolongs their residence time in the air 12. As the nanoparticles 40 cluster together, they become less susceptible to rapid oxidation, dissolution, or settling, allowing them to remain suspended in the air for a longer duration. This extended presence of the agglomerated nanoparticles 40 in the air 12 ensures a continuous and efficient air purification process, as they can interact with and neutralize airborne microorganisms 13 over an extended period.

Moreover, the agglomeration of the metal nanoparticles 40 can create a protective barrier against the recontamination of the purified air 12. As the agglomerated nanoparticles 40 accumulate and settle on surfaces, they form an antimicrobial coating that prevents the growth and proliferation of microorganisms 13. This protective layer of agglomerated nanoparticles 40 acts as a secondary line of defense, ensuring that the purified air 12 remains free from microbial contamination even after the initial neutralization process.

Accordingly, the agglomerated nanoparticles 40 enhance their interaction with airborne microorganisms 13 through physical adsorption, release of metal ions 41, and catalytic generation of reactive oxygen species. The increased size and surface area of the agglomerated nanoparticles 40 improve their chances of encountering and neutralizing microorganisms, while their prolonged stability in the air 12 ensures a continuous and efficient purification process. Additionally, the agglomerated nanoparticles 40 create a protective barrier against recontamination, maintaining the purity of the air even after the initial neutralization.

The candle 10 may comprise metal nanowires or nanofibers 65 integrated into the wick 50, and the metal nanowires or nanofibers 65 may generate additional metal nanoparticles 40x during burning of the candle 10. In an example, the burning rate of the candle 10 may be between 5 and 20 grams per hour, and more particularly between 5 and 15 grams per hour. This rate helps in the controlled regulation of nanoparticle 40 release. Additionally, the unique formulation of the candle 10, incorporating a blend of long, medium, and short-chain waxes, 20, 25, 30 contributes to effective particle agglomeration, further optimizing the air purification process. The wax composition 15 and the structure of the wick 50 are configured to achieve an optimal balance, ensuring that the candle 10 not only provides light and ambiance but also functions effectively as an air purifying agent.

The generation of additional metal nanoparticles 40x from the metal nanowires or nanofibers 65 integrated into the wick 50 during the burning of the candle 10 involves a complex chemical process. This process is influenced by the high temperature of the candle flame and the oxidizing environment created by the combustion of the wax composition 15. When the candle 10 is lit, the heat from the flame 51 melts the wax composition 15 near the wick 50. The liquid wax is then drawn up the wick 50 by capillary action, fueling the flame 51. As the candle 10 burns, the metal nanowires or nanofibers 65 integrated into the wick 50 are exposed to the high temperature of the flame 51, which can reach temperatures between 600° C. and 1400° C.

At these elevated temperatures, the metal nanowires or nanofibers 65 undergo a process called thermal decomposition or pyrolysis. During thermal decomposition, the heat energy from the flame causes the bonds within the metal nanowires or nanofibers 65 to break down, leading to the release of individual metal atoms or small clusters of atoms. The formation of metal oxide nanoparticles 40x is favored by the high temperature and the presence of oxygen in the candle flame. The newly generated metal oxide nanoparticles 40x are then released into the surrounding air 12 along with the candle smoke and other combustion products.

The burning rate of the candle 10, which is typically between 5 and 20 grams per hour, in an example, affects the generation rate of the metal oxide nanoparticles 40x. A higher burning rate means that more wax is consumed per unit time, leading to a greater exposure of the metal nanowires or nanofibers 65 to the flame 51. This increased exposure results in a higher rate of thermal decomposition and oxidation, producing a larger number of metal oxide nanoparticles 40x.

The released metal oxide nanoparticles 40x contribute to the overall air purification process by interacting with airborne microorganisms 13 and other pollutants in the air 12. The metal oxide nanoparticles 40x can adsorb onto the surface of the microorganisms 13, disrupting their cell membranes and causing oxidative stress. Additionally, the metal oxide nanoparticles 40x may catalyze the formation of reactive oxygen species (ROS), such as hydroxyl radicals (OH·), superoxide anions (O2·−), and hydrogen peroxide ($H_2O_2$), which further enhance the antimicrobial activity.

The continuous generation of metal oxide nanoparticles 40x from the metal nanowires or nanofibers 65 during the burning of the candle 10 ensures a sustained release of antimicrobial agents into the air 12. This constant supply of freshly generated nanoparticles 40x maintains the effectiveness of the air purification process throughout the burning time of the candle 10.

The chemical process described above is a simplified representation of the complex reactions occurring in the candle flame 51. The actual process may involve various intermediate steps, such as the formation of suboxides or the interaction of metal atoms with other combustion products like water vapor ($H_2O$) or carbon dioxide ($CO_2$). Additionally, the specific composition and morphology of the metal nanowires or nanofibers 65 can influence the kinetics and efficiency of the nanoparticle generation process.

Accordingly, the high temperature of the candle flame 51 causes thermal decomposition of the metal nanowires or nanofibers 65, releasing metal atoms or clusters. These metal species then react with oxygen in the air 12 to form metal oxide nanoparticles 40x, which are released into the surrounding environment. The continuously generated metal oxide nanoparticles 40x contribute to the air purification process by interacting with airborne microorganisms 13 and catalyzing the formation of reactive oxygen species.

Figure 7:
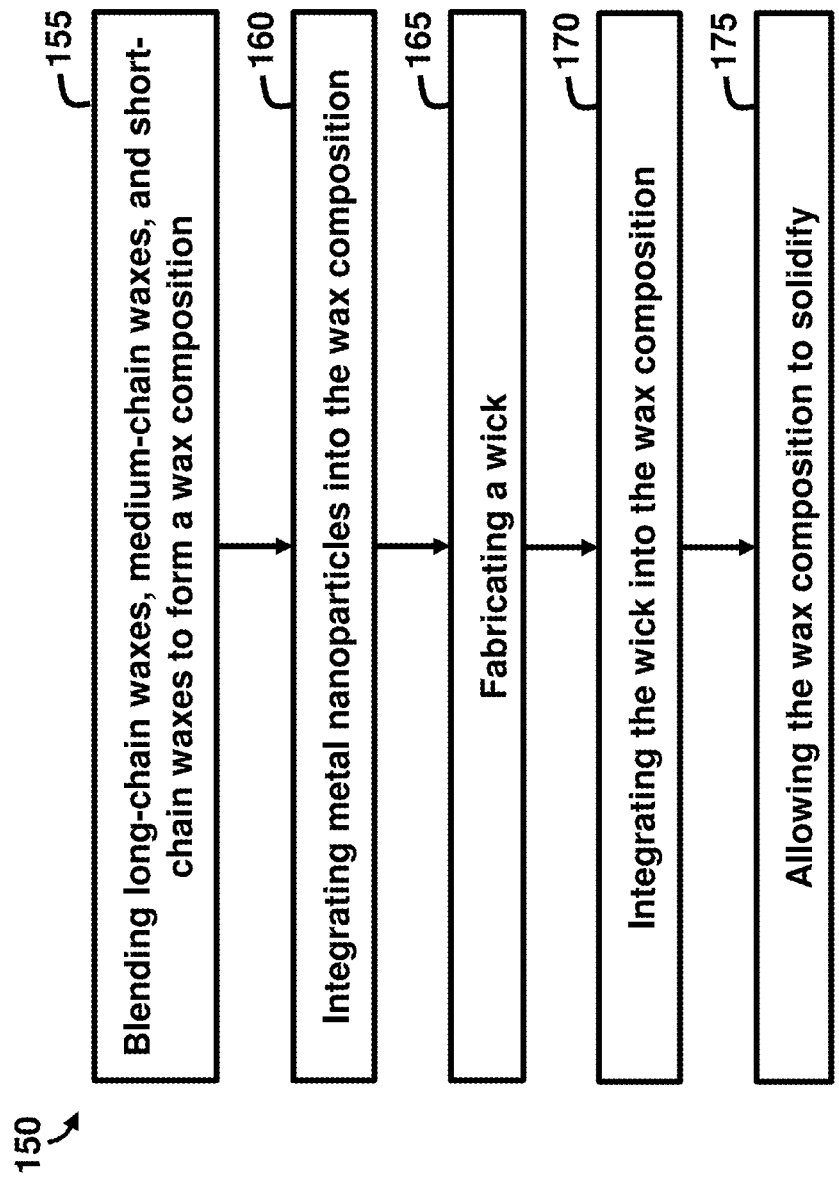
FIG. 7 is a flow diagram illustrating a method of manufacturing an air purification candle, according to an embodiment herein.

FIG. 7, with reference to FIGS. 1 through 6, is a flowchart illustrating a method 150 for manufacturing a candle 10. The method 150 comprises blending (155) long-chain waxes 20, medium-chain waxes 25, and short-chain waxes 30 to form a wax composition 15; integrating (160) metal nanoparticles 40 into the wax composition 15; fabricating (165) a wick 50; integrating (170) the wick 50 into the wax composition 15; and allowing (175) the wax composition 15 to solidify. Each step in the method 150 is carefully executed to create a candle 10 with superior air purification capabilities, utilizing the unique properties of the wax composition 15, metal nanoparticles 40, and the wick 50.

In the blending step (155), long-chain waxes 20, medium-chain waxes 25, and short-chain waxes 30 are blended to form a wax composition 15. The long-chain waxes 20, such as hydrogenated soy wax or beeswax, are melted and mixed with the medium-chain waxes 25, which may include soy wax, coconut wax, or palm wax. The short-chain waxes 30, such as fractionated coconut oil or MCT oil, are then added to the mixture. The specific ratios of these waxes are carefully determined based on factors such as the desired burning rate, fragrance throw, and stability of the final candle 10.

The blending step (155) may be carried out under controlled temperature conditions to ensure a homogeneous mixture and to prevent any degradation of the waxes 20, 25, 30. The temperature is typically maintained between 70° C. and 90° C., depending on the melting points of the specific waxes used. The mixture is stirred continuously to promote uniform distribution of the waxes and to avoid any phase separation.

In the integrating step (160), metal nanoparticles 40 are integrated into the wax composition 15. The metal nanoparticles 40, which are responsible for the air purification properties of the candle 10, are carefully selected based on their size, composition, and antimicrobial efficacy. The metal nanoparticles 40, such as silver nanoparticles, copper nanoparticles, or zinc oxide nanoparticles, are typically provided in the form of a concentrated dispersion or powder. The nanoparticles 40 are gradually added to the melted wax composition 15 under constant stirring to ensure their uniform distribution throughout the mixture. The stirring speed and duration are optimized to achieve a stable and homogeneous dispersion of the nanoparticles 40 within the wax matrix.

The concentration of the metal nanoparticles 40 in the wax composition 15 is carefully controlled to achieve the desired air purification performance while maintaining the stability and burning properties of the candle 10. Typically, the concentration of the nanoparticles 40 ranges from 0.01% to 1% by weight of the total wax composition 15.

In the fabricating step (165), the wick 50 is formed. Concurrent with the preparation of the wax composition 15, the wick 50 is fabricated (165) to provide the necessary support and fuel delivery system for the candle 10. The wick 50 is a crucial component that influences the burning characteristics, flame size, and overall performance of the candle 10. The wick 50 is typically made from natural or synthetic fibers, such as cotton, paper, or fiberglass, which are braided or woven into a specific size and shape. The choice of wick material and its dimensions are based on factors such as the diameter of the candle 10, the desired burning time, and the properties of the wax composition 15. In some embodiments, the wick 50 may incorporate additional features to enhance the air purification capabilities of the candle 10. For example, the wick 50 may be treated with antimicrobial agents or infused with metal nanoparticles 40 to provide additional release of active ingredients during the burning process.

In an example, the wick 50 may be made from 100% pure cotton, and the wick 50 is selected for its natural capillary action and clean burning characteristics. However, other wick compositions (such as wood or paper or hemp or cellulose) could be used assuming the capillary action is equivalent to the cotton wick. The cotton fibers in the wick 50 are tightly braided to achieve a precise burn rate, allowing the candle 10 to burn at a consistent rate of 5-20 grams per hour, for example. In an embodiment herein, the wick 50 undergoes a pre-treatment process to enhance its burning properties, involving a wax coating 60 for easy lighting and reliable burning.

In the integrating step (170), the wick 50 is integrated into the wax composition 15 containing the metal nanoparticles 40. This step (170) involves carefully positioning the wick 50 at the center of the candle mold and securing it in place using wick clips or other suitable methods. The wick 50 is then surrounded by the molten wax composition 15, which is poured into the mold at a controlled temperature. The pouring process is carried out slowly and steadily to avoid any air bubbles or uneven distribution of the wax. The temperature of the wax composition 15 during pouring is typically maintained between 70° C. and 80° C. to ensure optimal flow and adhesion to the wick 50.

In the allowing step (175), the wax composition 15 solidifies and cooled down to room temperature. This step (175) allows the candle 10 to achieve its final shape, stability, and burning properties. The filled mold containing the wax composition 15 and the integrated wick 50 is placed in a controlled environment with a temperature range of 20° C. to 25° C. The cooling process is gradual and uniform to prevent any cracking, shrinkage, or deformation of the candle 10. The cooling time depends on the size and shape of the candle 10, but typically ranges from a few hours to several days.

Once the wax composition 15 has completely solidified, the candle 10 is removed from the mold. Any excess wax or imperfections are trimmed or smoothed out to achieve the desired final appearance. The candle 10 may then undergo additional finishing processes, such as polishing or labeling, depending on the specific product requirements. Quality control measures are implemented throughout the manufacturing process to ensure the consistency, safety, and performance of the final product. These measures may include testing the burning characteristics, fragrance throw, and air purification efficacy of the candle 10, etc.

The method 150 ensures that the nanoparticles 40 are safely embedded within the wax composition 15, posing no risk during the use of the candle 10. The high efficacy of the nanoparticle 40 with the combined agglomeration effects of the wax composition 15 allow for very low concentration of nanoparticles 40 with high efficacy.

It is important to consider the safety for inhalation exposure for the nanoparticles 40 when burned in a typical use application. For silver nanoparticles, the National Institute for Occupational Safety and Health (NIOSH) has recommended an exposure limit (REL) of 0.9 $\mu g/m^3$ as an airborne respirable 8-hour time-weighted average (TWA) concentration for particles with a primary size of 100 nanometers or less. Additionally, they continue to recommend a REL of 10 $\mu g/m^3$ as an 8-hour TWA for total silver, which includes metal dust, fumes, and soluble compounds. The efficacy range and burn rate of the candle 10 are used to estimate that the actual stead-state concentration exposure in a typical residential environment is 50-100× below OSHA safety limits for metal nanoparticles.

According to an example, the blending step (155) may comprise hydrogenating at least a portion of the long-chain waxes 20. This hydrogenation process is carefully controlled and optimized to enhance the performance, stability, and burning properties of the final candle product. Hydrogenation is a chemical reaction in which unsaturated compounds, such as unsaturated fatty acids present in the long-chain waxes 20, are converted into their saturated counterparts by the addition of hydrogen ($H_2$) molecules. The process is typically carried out in the presence of a catalyst, such as nickel or platinum, at elevated temperatures and pressures.

In the context of the candle manufacturing method 150, the hydrogenation of the long-chain waxes 20 offers several key distinctions. First, it provides for an increased melting point. Hydrogenated long-chain waxes 20 have a higher melting point compared to their non-hydrogenated counterparts. This higher melting point contributes to the overall stability and rigidity of the candle 10, preventing deformation or slumping during storage and use. Second, it provides for improved burning characteristics. The hydrogenated long-chain waxes 20 exhibit enhanced burning properties, such as a slower burn rate and reduced soot formation. These characteristics help to ensure a cleaner and more efficient burn, prolonging the life of the candle 40 and minimizing any negative impact on indoor air quality.

Third, it provides for better compatibility with other ingredients. Hydrogenated long-chain waxes 20 have improved compatibility with the medium-chain waxes 25, short-chain waxes 30, and other additives present in the wax composition 15. This compatibility promotes a more homogeneous and stable mixture, reducing the risk of phase separation or other adverse interactions. The hydrogenation process is carefully controlled to achieve the desired level of saturation in the long-chain waxes 20. The extent of hydrogenation can be adjusted based on factors such as the specific wax composition, the intended burning properties, and the overall performance requirements of the candle 10.

According to an example, to begin the hydrogenation process, a portion of the long-chain waxes 20, such as soy wax or beeswax, is melted and placed in a pressure reactor vessel. The reactor is then purged with hydrogen gas to remove any air or moisture that could interfere with the reaction. The catalyst, typically in the form of a finely divided metal powder, is added to the melted wax. The reaction mixture is heated to a specific temperature range, typically between 150° C. and 200° C., and subjected to high pressure, usually ranging from 10 to 50 atmospheres. The hydrogen gas is continuously fed into the reactor, allowing it to react with the unsaturated bonds present in the long-chain waxes 20. The hydrogenation reaction progresses until the desired level of saturation is achieved. The extent of hydrogenation is monitored and controlled by measuring the iodine value (IV) of the wax, which indicates the degree of unsaturation. A lower iodine value corresponds to a higher level of saturation. Once the target iodine value is reached, the reaction is stopped by cooling the mixture and releasing the pressure. The hydrogenated long-chain waxes 20 are then filtered to remove the catalyst and any impurities. The resulting product is a more saturated and stable form of the long-chain waxes 20, which will be used in the subsequent blending steps of the candle manufacturing process. The hydrogenated long-chain waxes 20 are then combined with the medium-chain waxes 25 and short-chain waxes 30 according to predetermined ratios. The blending process ensures a homogeneous and stable mixture that will form the basis of the wax composition 15.

According to an example, the integrating (160) of the metal nanoparticles 40 into the wax composition 15 may comprise high-shear mixing in order to ensure a homogeneous and stable dispersion of the nanoparticles 40 within the wax composition 15. This helps achieve the optimal distribution and performance of the antimicrobial metal nanoparticles 40, enhancing the overall air purification capabilities of the candle 10. High-shear mixing is a powerful and efficient mixing method that utilizes high mechanical energy to generate intense shear forces within the mixture. These shear forces are capable of breaking down agglomerates, dispersing particles, and creating a uniform and stable dispersion. In the context of integrating the metal nanoparticles 40 into the wax composition 15, high-shear mixing offers several distinctions.

First, with regards to uniform distribution, high-shear mixing ensures that the metal nanoparticles 40 are evenly distributed throughout the wax composition 15. This uniform distribution is necessary for maintaining consistent air purification performance across the entire candle 10. Second, with regards to reduced agglomeration, metal nanoparticles 40 have a tendency to agglomerate due to their high surface energy and attractive forces. High-shear mixing effectively breaks down these agglomerates, reducing the particle size and preventing the formation of large clusters that could hinder the air purification process. Third, with regards to improved stability, the intense shear forces generated during high-shear mixing help to overcome the interfacial tension between the metal nanoparticles 40 and the wax composition 15. This results in a more stable dispersion, minimizing the risk of sedimentation or phase separation over time. Fourth, with regards to enhanced surface area, by breaking down agglomerates and reducing particle size, high-shear mixing increases the effective surface area of the metal nanoparticles 40. This increased surface area promotes better interaction between the nanoparticles 40 and the airborne microorganisms 13, enhancing the overall air purification efficiency.

The high-shear mixing process begins by preparing the wax composition 15 according to the blending (155) step described earlier. The long-chain waxes 20, medium-chain waxes 25, and short-chain waxes 30 are melted and combined in the predetermined ratios to form a homogeneous mixture. Next, the metal nanoparticles 40, such as silver nanoparticles, copper nanoparticles, or zinc oxide nanoparticles, are introduced into the melted wax composition 15. The nanoparticles 40 are typically provided in the form of a concentrated dispersion or powder, and the amount added is carefully controlled to achieve the desired concentration in the final candle 10. The mixture of the wax composition 15 and the metal nanoparticles 40 is then subjected to high-shear mixing using specialized equipment, such as a high-shear mixer or homogenizer. These devices are designed to generate intense shear forces by employing high-speed rotors, stators, or impellers that create turbulent flow and cavitation within the mixture.

During the high-shear mixing process, the mixture is exposed to shear rates ranging from 10,000 to 100,000 $s^{-1}$ (reciprocal seconds). These high shear rates are sufficient to break down agglomerates, disperse the metal nanoparticles 40, and create a homogeneous and stable dispersion within the wax composition 15. The duration of the high-shear mixing process is carefully controlled to ensure optimal dispersion without compromising the integrity of the metal nanoparticles 40 or the wax composition 15. Typically, the mixing time ranges from a few minutes to several hours, depending on the specific formulation and the desired level of dispersion. Throughout the high-shear mixing process, the temperature of the mixture is closely monitored and maintained within a specific range, typically between 70° C. and 90° C. This temperature control is crucial to ensure that the wax composition 15 remains in a molten state and to prevent any adverse effects on the metal nanoparticles 40.

The nanoparticles 40 are blended with the long-chain waxes 20 under high shear force, ensuring uniform distribution. Nanoparticle concentration is in the range of 1 to 50 micrograms nanoparticles per gram of wax (1-50 ppmw). This mixture is then dispersed into the primary wax blend, and mixed ensuring even nanoparticle distribution throughout the candle 10.

After the high-shear mixing process is complete, the resulting mixture is a homogeneous and stable dispersion of the metal nanoparticles 40 within the wax composition 15. This mixture is then ready for the subsequent steps of the manufacturing process, including the integration (170) of the wick 50 and the allowing (175) of the solidification of the wax composition 15. Quality control measures are implemented throughout the high-shear mixing process to ensure the consistency and performance of the final candle 10. These measures may include particle size analysis, microscopic imaging, and stability testing to verify the uniform distribution and long-term stability of the metal nanoparticles 40 within the wax composition 15.

In the development of the candle 10, paramount importance is placed on ensuring the safety and biocompatibility of all materials used. This commitment extends to the metal nanoparticles 40 integrated into the wax composition 15, which undergo rigorous testing to ensure their safety for inhalation. The nanoparticles 40 are contained within the wax composition 15 at concentrations that are carefully calculated to remain well below safe exposure limits during burning in residential spaces. The formulation of the candle 10 includes natural waxes and oils derived from vegetable or other organic sources, ensuring that the candle 10 is non-toxic and environmentally friendly. This approach aligns with a growing consumer preference for products made from natural and sustainable materials.

Furthermore, the candle 10 is designed and manufactured in compliance with the highest environmental and safety standards. This includes adherence to the occupational exposure limits for nanoparticles as established by regulatory bodies like OSHA and NIOSH. The operational parameters of the candle 10 are meticulously calibrated to ensure that the release of nanoparticles 40 during use falls well within these safe exposure limits. Furthermore, the use of natural, organic waxes and oils in the candle 10 underscores a commitment to sustainability, ensuring that the product's manufacturing process minimizes environmental impact. By incorporating these eco-friendly materials, the candle 10 not only provides an effective air purification solution but also supports environmental stewardship.

The candle 10 along with the methods 100, 150 provide novel approaches to air purification that marries efficacy with environmental consciousness. The embodiments herein aim to redefine indoor air quality management, emphasizing both functionality and sustainability. There are several unique aspects provided by the embodiments herein including nanoparticle integration in the candle 10, advanced wax composition 15, and an eco-friendly and efficient configuration of the wick 50. Embedded within the wax composition 15 are metal nanoparticles 40, known for their antibacterial and virucidal properties. These nanoparticles 40, primarily composed of metals like silver, copper, and gold alloys, are less than 50 nm in size, with a substantial proportion in the 20-30 nm range. The integration process (160) involves heating and high shear mixing, allowing the nanoparticles 40 to be evenly dispersed within the wax composition 15.

The candle 10 comprises a specialized blend of hydrogenated long-chain waxes 20, predominantly hydrogenated jojoba wax in an example, combined with a variety of medium-chain waxes 25 and short-chain vegetable waxes 30, such as soy, coconut, palm, beeswax, olive, apricot, and others. This advanced wax composition 15 serves two primary purposes: (i) the formulation is designed to enhance environmental particle agglomeration and removal from the air 12, and (ii) ensures a controlled burn rate and facilitates the optimal release of nanoparticles 40. The wick 50, made from high-quality cotton, is braided to control the burn rate of the candle 10, ensuring a consistent and steady burn between 5-20 grams per hour. This configuration aids in the effective release of nanoparticles 40 and directly contributes to the overall efficiency of the candle 10.

The candle 10 distinguishes itself through its controlled release of nanoparticles 40. Embedded within its specialized wax composition 15 (blend), these nanoparticles 40 are meticulously designed to be released at a steady rate as the candle 10 burns. This consistent release ensures a uniform distribution of nanoparticles 40, which are kept within safe air concentration levels (50-100× below OSHA limits), adhering to established occupational exposure limits. The candle 10 does not require electricity or frequent maintenance, making it an energy-efficient and low-maintenance option for consumers. Moreover, its use of naturally derived materials and non-toxic nanoparticles 40 aligns with eco-friendly standards, offering a greener alternative for indoor air purification. The candle 10 offers an aesthetically pleasing, practical solution to the growing concern for indoor air quality.

The candle 10 harnesses the antibacterial and virucidal properties of metal nanoparticles 40, primarily composed of nontoxic silver nanoparticles according to an example. As the candle 10 burns, a proportion of these nanoparticles 40 are ionized and released into the air 12. The enhanced agglomeration effect offered by the wax composition 15 aggregated aerosolized microbes bringing them into direct contact with the metal nanoparticle 40 where they actively neutralize and remove a wide-range of airborne microorganisms 13, including bacteria, viruses, and spores. This significantly contributes to a healthier indoor environment, reducing the risk of respiratory diseases. The effectiveness of these nanoparticles 40 is enhanced by their size, which is engineered to be predominantly below 50 nm diameter in size. This size optimization increases the surface area and reactivity of the nanoparticles 40, making them highly efficient in pathogen neutralization.

Experiments

The embodiments herein were experimentally tested according to the following series of experiments. The specific devices, orientations, configurations, geometries, sizes, temperatures, timings, ratios, speeds, techniques, colors, and/or types and amounts of materials, etc. described in the experiments below are merely exemplary, and the embodiments herein are not restricted to any particular structure, property, technique, or material described below. Accordingly, the experiments are merely being presented to demonstrate the feasibility of the embodiments herein and are not meant to restrict how the invention may be practiced.

The experiments were conducted by Aerosol Research and Engineering Laboratories, Inc., Olathe, KS (USA) which specializes in bioaerosol decontamination studies. The purpose of the experiments was to measure the efficacy of the candle 10 for reducing the aerosolized RNA virus, MS2, per the ASHRAE 241-2023 test standard. ASHRAE 241-2023 test standard is an industry wide standard specifically for evaluating air purifiers against aerosolized viruses.

Additional experiments against a broad-spectrum of aerosolized microorganisms were conducted following FDA 510(k) protocols for Air Purifier Testing. The FDA 510(k) guidelines are used specifically for approval of air purifiers to be sold as an FDA approved medical device. The same candle 10 was challenged via aerosol using: 2 Gram-positive Bacteria, 2 Gram-negative Bacteria, 1 RNA virus, 1 DNA virus, 1 Mold spore, and 1 yeast species. The purpose of these experiments is to demonstrate broad-range efficacy of the candle 10. Experimentally, the candle 10 has shown approximately 2.0 net LOG or greater reduction (>99%) in a 16 m$^3$ laboratory test chamber in 2 hours for the following microorganisms:

Air-borne bacteria: Gram-Positive Species: Methicillin Resistant *Staphylococcus epidermidis* (99.12%) and *Listeria innocua* (99.97%).

Air-borne bacteria: Gram-Negative Species: *Pseudomonas syringae* (99.78%) and *Klebsiella aerogenes* (99.99%).

Air-borne viruses: non-enveloped RNA virus MS2 (99.74%), non-enveloped DNA virus PhiX-174 (99.15%).

Air-borne yeast: *Candida albicans* (97.71%), opportunistic pathogenic yeast.

Mold spores are one of the most resilient types of microorganisms to show efficacy against. FIG. 9 shows an illustration of the FDA cataloged resistance level for different microorganism types, showing spore challenges being the most difficult type of microorganism to effectively neutralize. Experimentally, the candle 10 has shown approximately 0.75 net LOG (82%) in a laboratory test chamber in approximately 2 hours for the Air-borne black mold spore *Aspergillus brasiliensis*.

A 16 oz. version of the candle 10 was ignited and sealed in a 30 m$^3$ environmental test chamber for testing. MS2 was aerosolized into the chamber using a Collison 24-jet nebulizer. Bioaerosol samples were taken, with AGI 30 glass impingers, at multiple time points throughout each test and control trial, following ASHRAE 241 and AHAM AC-5 testing parameters. The impinger samples were serially diluted, plated, incubated, and enumerated in triplicate to yield the viable bioaerosol concentration for each sampling time point. This data was plotted and used to quantify the reduction rate capability of the candle 10. The natural decay rate of MS2 was subtracted from the device trial data to yield the net log reduction attributable to the device for each bioaerosol challenge. A total of three control (natural decay rate) trials and three candle 10 trials were performed to validate repeatability, per the ASHRAE 241 standard. No deviations from the ASHRAE 241 standard were made for the study.

The candle 10 achieved an MS2 net log reduction of 1.08±0.03 (92%±1%) in 60 minutes, and 1.33±0.03 (95%±0.7%) in 90 minutes. The clean air delivery rate (CADR) of the candle 10 achieved an average CADR of 57.9±7.4 cubic feet per minute (CFM) at the 30 minute point (ASHRAE Standard, minimum 5 sample points).

The candle 10 effectively reduces airborne MS2 virus respirable particles in a controlled environment, meeting ASHRAE 241-2023 standards for air purification. The consistent CADR and overall net log reduction demonstrate the ability of the candle 10 to reduce the viability of aerosolized viruses, thereby potentially reducing respiratory disease transmission.

On Jun. 24, 2023, the new ASHRAE 241-2023 guidelines were released to establish a more uniform testing protocol for all air purification devices. This protocol standardized all bioaerosol testing components for in-duct and standalone devices. The testing protocol establishes the minimum requirements for evaluating all production air purification devices effectively and consistently. The ASHRAE standard includes guidelines for proper ventilation, infectious risk management, laboratory testing requirements, the operation and maintenance of devices, and special requirements needed for residential and healthcare facilities. With these new guidelines, testing must be performed on all certified air purification devices that are stated as adhering to the ASHRAE 241 standard guidelines. The test plan incorporated challenging the candle 10 using the ASHRAE 241 and AHAM AC-5 protocols and the requirements for a 30 m$^3$ test chamber.

The effectiveness of the candle 10 was evaluated against a single aerosolized organism, MS2, an ssRNA virus, following ASHRAE 241 and AHAM AC-5 testing standards. A test matrix for ASHRAE 241 testing is provided in FIG. 8. The tested candle 10 was cylindrical, measuring 4 inches in diameter and 3 inches deep, and included two cotton wicks. The experimentally tested candle 10 is configured as a 16 ounce candle in a glass jar, comprising of a blend of long, medium, and short chain waxes 20, 25, 30. The candle 10 includes soy and coconut medium chain waxes, combined with therapeutic grade essential oils for fragrance. The candle 10 further includes silver nanoparticles 40 at a concentration of 10 micrograms per gram of wax.

Testing Equipment

Bioaerosol Testing Chamber—The test chamber is the main component in bioaerosol testing used for controlled manipulation and testing of microorganisms. It allows for the introduction, sampling, and secure confinement of microorganisms, thus contributing to the precision and reproducibility of testing outcomes. The 30 m$^3$ test chamber that was used in the experiment adheres to the stringent guidelines in AHAM AC-5 and aligns with both AHAM and ASHRAE 241 criteria.

Structurally, the chamber has dimensions of 30±1.5 cubic meters, or approximately 1060 ft$^3$, with the width deliberately maintained within 85-100% of its length. This dimensional consistency ensures a uniform testing space, allowing reliable experimentation. Constructed from a non-porous material, the chamber's walls exhibit notable qualities. Beyond its physical attributes, this material emits minimal volatile organic compounds (VOCs), is non-reactive, non-reflective, and has a non-ionizing quenching nature. This creates an environment conducive to reliable and repeatable testing conditions.

Airtight integrity is monitored and controlled within the chamber, achieving a controlled air change rate (ACH) below 0.05, as per the benchmark set by ASTME 741. This characteristic allows the operator to isolate the testing environment, thus enhancing result reliability. The chamber is designed to prevent external microbial contamination while maintaining internal atmospheric conditions. These features include an aseptic maintenance system, HEPA filtration, cross-contamination-free item transfer mechanisms, external power control, real-time observation facilitated by multiple viewing windows, and the capability to produce and evenly disperse aerosolized microbes. Sampling ports, positioned approximately 48 inches from the floor and 18 inches from the walls, ensure optimal sample collection while maintaining prescribed device separation. A programmable controller maintains the chamber's temperature and humidity within ASHRAE 241 limits. Incorporating negative pressure airflow allows for controlled purging, and a HEPA filter adds an additional layer of protection, inhibiting potential contamination. The 30 m$^3$ testing chamber at ARE Labs fulfills both AHSRAE 241 and AHAM AC-5 requirements.

Bioaerosol Generation System—As per the AHAM AC-5 requirements, the Collison nebulizers produces 0.05 µm to 5 µm particles from microbial suspensions using compressed air to generate aerosols. The nebulizer fluid is a mixture of the test microorganism, fresh growth media, phosphate buffer solution (PBS), and an antifoaming agent. A ceiling fan is used in the chamber to allow for homogenous mixing.

A 24-Jet Collison (available from BGI Inc., Waltham, MA) was used during testing to introduce the properly sized particulates into the test chamber. The biologic was mixed with half PBS, half fresh Tryptic Soy Broth (TSB), both made with distilled water and 100 µL of antifoam A concentrate. The aerosolization of bioaerosol was driven by dry, filtered air. A pressure regulator allowed for control of disseminated particle size, use rate, and sheer force generated within the Collison nebulizer. Prior to testing, the Collison nebulizer flow rate and use rate were checked using an air supply pressure of approximately 40-60 psi, which produced an output volumetric flow rate of 60 L/min with a fluid dissemination rate of approximately 1.25 mL/min. The Collison nebulizer was flow characterized using a calibrated TSI model 4040 mass flow meter (available from TSI Inc., St. Paul, MN).

Bioaerosol Sampling System—Two AGI-30 impingers (available from Ace Glass Inc., Vineland, NJ) were used for bioaerosol collection to determine chamber concentrations. These two AGI-30 Impingers were placed on opposite sides of the chamber in order to better represent the entire room. The mixing fans inside the chamber worked to ensure a homogenous air mixture inside the chamber. The AGI-30 impinger vacuum source was maintained at a negative pressure of greater −17.5 inches of Hg during all characterization and test sampling to assure critical flow conditions. The AGI-30 impingers sample at a rate of 12.5 LPM impinger flows were characterized using a calibrated TSI model 4040 mass flow meter.

Temperature and Humidity Monitor/Controller—The temperature and humidity within the chamber are monitored and controlled with an AC Infinity® Controller 69 (available from AC Infinity, Inc., Brea, CA). This controller allows for real-time monitoring and control of the temperature in the 30 m$^3$ bioaerosol chamber used for testing. Temperature and humidity control is essential for the stability of aerosolized microorganisms during testing. ASHRAE 241 and AHAM AC-5 both have temperature and humidity requirements for temperature and humidity inside of the bioaerosol chamber during testing. The required range for humidity is 50%±10% while the temperature range is 73° F.+5° (23° C.+3° C.).

Chamber Bioaerosol Control Trials—Chamber bioaerosol control trials involved assessing the natural decay rate of the test bioaerosol within the chamber over time without the air purifier in operation. This time aligns with the intended operational testing time of the air purifier, with multiple sampling point intervals to establish a robust natural decay curve. Bioaerosols were collected using an AGI-30 impinger filled with phosphate-buffered saline (PBS) solution with 0.005% of the surfactant Tween® 80, ensuring a representative and homogeneous sample. The sampling rate and volume were precisely defined. Multiple impingers were employed in parallel to enhance collection accuracy.

The samples collected in the impingers are then carefully processed through serial dilution, plating, and enumeration in triplicate (see plating and enumeration section for more information). This analysis provides viable bioaerosol concentrations at each sampling point and contributes to accurate data interpretation. For increased stability of bioaerosols, the relative humidity inside the chamber was kept at 50%±10% using a PID humidity controller in combination with an ultra-sonic humidifier to nebulize filtered DI water. Temperature controls maintain chamber trial conditions at typical ambient conditions of 73° F.±5° F. per ASHRAE 241 requirements. These control tests implement the ANSI/AHMA AC-5 2022 guidelines, ensuring a thorough and precise assessment of air cleaner performance in reducing airborne microbes. The methodical approach, from preparation to measurement and analysis, underscores the importance of consistent and accurate testing procedures.

Bioaerosol Testing

Efficacy Evaluation Procedure—The process of evaluating the efficacy of air cleaners in reducing airborne microbial concentrations is similar to control test trials, but the test chamber contains the air purifier in operation. A suspension of test microbes is nebulized into the chamber air, and an initial measurement of the microbial concentration is taken before activating the air purifier. Once the baseline is set, the air purifier is activated, with the operation time varying according to the specific characteristics of the unit. For air cleaners with higher Clean Air Delivery Rates (CADR), the operation time could be as brief as 10 minutes, while those with lower CADR might necessitate up to 60 minutes of operation. During the air cleaner's operation, air samples are systematically collected from the chamber at 4-minute intervals over a 20-minute duration, a 30-minute sample and then every 15 minutes out to 90 minutes. These samples are pivotal in assessing the air cleaner's effectiveness in reducing the microbial concentration.

The collected samples undergo the following procedure: Serial dilution of the samples is followed by plating, and the viable bioaerosols are enumerated (see plating and enumeration description below for more information regarding plating). This analysis yields the viable microbial air concentration at each time point, providing a quantifiable measure of the air cleaner's performance. It is worth noting that, in cases where the microbial concentration becomes exceedingly low, an extension of the sample duration beyond the originally planned 2-minute mark may be implemented, to improve limits of detection.

In adhering to the ASHRAE 241/AHAM protocol, the real-world efficacy of air cleaners across varying operating conditions and CADR levels can be established, thus producing more accurate conclusions regarding indoor air quality management.

Bioaerosol Challenge Particle Size Testing—Bioaerosol challenge particle size distributions were measured with a TSI Aerodynamic Particle Sizer model 3321 (APS) for all challenge species. The particle size distribution was taken shortly after aerosolization for each species via sampling through a sample probe into the test chamber. The APS has a dynamic measurement range of 0.54 to 20.0 µm and was programmed to take consecutive real-time one-minute aerosol samples.

Species Selection—The ASHRAE 241/AHAM guidelines for biological species selection requires testing be conducted using enveloped RNA virus MS2. MS2, is a ssRNA virus and is very commonly used as a surrogate for various influenza strains and also as a surrogate for SARS-cov2.

Plating and Enumeration—Impinger and stock biological cultures were serially diluted and plated in triplicate. Multiple drop samples are used for each dilution using a standard drop plate technique onto tryptic soy agar plates. Viral samples and stock were serially diluted, paired with eh viral host and plated using the well-known small drop plaque assay techniques outlined by A. Mazzocco, T. Waddell, E. Lingohr, and R. Johnson. The plates were then incubated 8-12 hours and enumerated. All colonies and plaques counts were manually enumerated and recorded. The number of colonies or plaques that form on the plates is counted and used to calculate the original viral concentration in the liquid impinger sample. Impinger viral concentration were then used to calculate the chamber bioaerosol concentration using the samplers flow rate and collection time.

Post-Testing Decontamination and Preparation—After the completion of each testing session, a series of post-test actions were carried out to ensure the integrity and cleanliness of the testing environment. The interior of the test chamber underwent decontamination using a UV-C lamp or an appropriate disinfectant solution such as vaporous hydrogen peroxide (35%) to ensure the elimination of any residual bioaerosols in accordance with ANSI/AHAM AC-5-2022 guidelines (Section 5.1.14).

The chamber underwent a minimum of twenty minutes of air flow evacuation/purging to restore baseline particle concentration levels, as assessed by the APS. Special care was taken to ensure the thorough removal of any contaminants, with an emphasis on preventing residue buildup on surfaces and in the air. Adequate air exchanges were employed to facilitate the decontamination process, and this step was particularly rigorous when transitioning between different test microbes to mitigate cross-contamination risks.

Bioaerosol Data Analysis

Results from the control trials were plotted to show natural viability loss over time in the chamber. These control trials served as the basis for determining the efficacy of the candle 10, above the natural losses from the control trials. All trial data were normalized using the initial concentrations at time zero as the reference point, set to 0.0 Log reduction. Log reductions for each subsequent timepoint were calculated relative to this starting point. For each unique sample timepoint, the triplicate control losses were averaged to produce an average log reduction for the control trial set. This average control log reduction for each timepoint was then subtracted from the corresponding trial sample timepoint, resulting in a net Log reduction for each of the three candle trials. The average net log reduction at each timepoint was determined by averaging the three candle trials.

Clean Air Delivery Rate Calculations (CADR)—The clean air delivery rate (CADR) was calculated for the candle 10. The clean air delivery rate is the volume of air that has been purified of viable MS2 virus. This is calculated using the fraction of bioaerosol removed, multiplied by the volumetric flow rate, typically in cubic feet per minute (CFM) of the device. For CADR calculations, the difference in slopes for the average of three control and test trials was calculated to determine the equivalent air exchange rate. The slope of the test trials was determined using the entire trial data of the natural log of the bioaerosol concentration reduction over time. The CADR was then calculated by multiplying the equivalent air exchange rate by the volume of the test chamber (30 m$^3$). FIG. 10 shows a graphical example of the CADR calculations performed.

Results

The experimental study assessed the efficacy of the candle 10 in reducing live airborne MS2 virus respirable particles in a controlled 30 m$^3$ bioaerosol test chamber. The candle 10 demonstrated significant reduction of aerosolized MS2 virus throughout the test duration, as indicated below:

10-minute: The candle trials rapidly achieved roughly a 50% reduction of viable airborne virus.

60-minute: Achieved a net log reduction of 1.08±0.03, equivalent to a 92%±1% reduction.

90-minute: Achieved a net log reduction of 1.33±0.03, equivalent to a 95%±0.7% reduction.

FIG. 11 shows a table overview of both log and net log reduction for all ASHRAE 241 candle trials. All trials were performed in the 30 m$^3$ chamber under the same conditions per testing standard. As experimentally demonstrated, the candle 10 effectively reduces airborne MS2 virus particles in a controlled environment, meeting ASHRAE 241-2023 standards for air purification. The consistent CADR and overall net log reduction demonstrate the candle's ability to reduce the viability of aerosolized viruses, thereby potentially reducing respiratory disease transmission. The candle consistently reduced the airborne RNA virus MS2, a very hardy enveloped virus, and showed a log-linear reduction trend in the 30 m$^3$ test chamber.

FIG. 12 shows a table of testing results for eight additional broad-ranges bioaerosol species challenges for the candle 10. The results summary table show broad-range efficacy against multiple species and multiple classes for the candle 10.

Additional Bioaerosol Results

Additional trials were carried out in a similar fashion following FDA 510(k) method for assessing air purifier seeking approval by the FDA as a medical device. Testing is conducted almost identical to the ASHRAE 241 trials except for microbe selection, sampling rate, and total trial time. This testing was carried out on eight different micros to show broad range efficacy of the candle 10. Following this method experimentally, the candle 10 has shown 2.0 net log or greater reduction (>99%) in a laboratory test chamber (16 m$^3$) in 2 hours for the following microorganisms:

Air-borne bacteria: Gram-Positive Species: Methicillin Resistant *Staphylococcus epidermidis* (MRSE) (99.1%) and *Listeria innocua* (99.97%).

Air-borne bacteria: Gram-Negative Species: *Pseudomonas syringae* (99.78%) and *Klebsiella aerogenes* (99.99%).

Air-borne viruses: non-enveloped RNA virus MS2, non-enveloped DNA virus PhiX-174. (99.74%).

Air-borne yeast: *Candida albicans*, opportunistic pathogenic yeast (97.7%).

Against the most challenging class, spore challenge, the candle 10 showed experimentally approximately 0.75 net log (82%) in a laboratory test chamber in approximately two hours for the air-borne black mold spore *Aspergillus brasiliensis*.

Statistical Significance—All trials were performed in triplicate to ensure statistical significance. The results were consistent across trials, with standard deviations indicating minimal variability, thus confirming the reliability of the data.

Deviations and Acceptance Criteria—No deviations from the protocol were noted throughout the test trials. All final endpoints were ≤0.30 standard deviations from the mean.

These experimental tests demonstrate that the candle 10, besides its great efficacy against a broad range of pathogens, functions by killing the airborne microorganisms 13. The candle 10 is designed for versatility, making it suitable for both residential and commercial settings. In homes, the candle 10 can be used to enhance air quality, creating a healthier living environment, especially in areas with limited ventilation or in urban settings where air quality is a concern. In commercial spaces like offices, spas, and wellness centers, the candle 10 serves as a dual-purpose solution, providing both ambient lighting and air purification. The natural and non-toxic wax composition 15 makes the candle 10 an attractive option for businesses looking to create a health-conscious environment for customers and employees.

The candle 10 also holds significant potential in healthcare settings such as clinics, nursing homes, and hospitals. In these environments, maintaining clean air is crucial for patient health and infection control. The ability of the candle 10 to neutralize airborne pathogens offers an additional layer of air purification, complementing existing HVAC systems. The soothing light provided by the candle 10 and, in one example, incorporation of therapeutic fragrances can also contribute to creating a calming and healing atmosphere for patients and staff.

Compared to traditional air purifiers, the candle 10 stands out for its eco-friendly and energy-efficient nature. Unlike electric purifiers, the candle 10 requires no power source, making it sustainable and cost-effective. The use of natural, organic waxes 20, 25, 30 and non-toxic nanoparticles 40 aligns with growing environmental consciousness among consumers. The functional and aesthetic appeal of the candle 10 and the simplicity of its use addresses the needs of consumers looking for practical, natural, and effective air purification solutions. The candle 10 can be used both as a standalone product and as part of a larger product ecosystem in air purification and health safety.

The candle 10 employs nanotechnology for the purpose of air purification and specifically for removal and deactivation of air-borne pathogens. The candle 10 features a dual-technology approach. Firstly, utilizing a proprietary wax blend that incorporates long-chain waxes 20 engineered to enhance binding to airborne particles, thus enhancing their agglomeration effect and facilitating the removal of suspended airborne particles. Secondly, the employment of metal nanoparticles 40 within the wax composition 15 of the candle 10. These nanoparticles 40 are specifically tailored for deactivation of airborne microorganisms 13 by binding wax/metal nanoparticle complexes to these pathogens. Once bound, the pathogen is deactivated and eventually removed from the air 12. This innovative integration of materials not only purifies the air 12 but also actively combats respirable microbial presence, thus improving indoor air quality and reducing respiratory disease transfer.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A candle for air purification, the candle comprising:
a wax composition comprising a blend of long-chain waxes, medium-chain waxes, and short-chain waxes, wherein the long-chain waxes comprise hydrogenated waxes having carbon chain lengths of C38-C44 and are present in an amount of 0-15% of a total composition of the wax composition, the medium-chain waxes comprise waxes having carbon chain lengths of C16-C20 and are present in an amount of 60-100% of the total composition of the wax composition, and the short-chain waxes comprise waxes having carbon chain lengths less than C16 and are present in an amount of 0-15% of the total composition of the wax composition;
a plurality of metal nanoparticles embedded within the wax composition and are to be released into surrounding air during burning of the candle for neutralizing airborne pathogens, wherein the plurality of metal nanoparticles are uniformly dispersed within the wax composition through high-shear mixing, and wherein:
the plurality of nanoparticles are less than 50 nm in size,
are composed of alloy metals comprising silver, copper, zinc, or gold alloys, or a combination thereof, and are coated, and
are present in a concentration range of 1 to 50 micrograms of nanoparticles per gram of wax composition; and
a wick for burning the wax composition,
wherein burning the candle releases metal nanoparticles into the air creating charged nucleation points that attract airborne particulates to form complexes infused with the plurality of metal nanoparticles, and wherein burning the candle achieves at least 60% reduction in airborne microorganisms selected from the group consisting of Gram-positive bacteria, Gram-negative bacteria, enveloped viruses, non-enveloped viruses, yeast, and mold spores.

2. The candle of claim 1, wherein the long-chain waxes comprise hydrogenated jojoba wax, carnauba wax, bees wax, or other long chain wax, or a combination thereof.

3. The candle of claim 1, wherein the medium-chain waxes comprise soy wax, coconut wax, palm wax, olive wax, apricot wax, or other medium-chain wax, or a combination thereof.

4. The candle of claim 1, wherein the short-chain waxes are derived from soy, coconut, or other organic sources containing short-chain oils or waxes, or a combination thereof.

5. The candle of claim 1, wherein the long-chain waxes undergo incomplete combustion during burning of the candle to create charged nucleation points that attract airborne particulates to form complexes infused with the plurality of metal nanoparticles.

6. The candle of claim 5, wherein the complexes bind to and deactivate airborne microbes while simultaneously reducing recontamination of purified air.

7. The candle of claim 1, wherein the wick comprises:
a braided cotton core; and
a coating comprising a wick wax.

8. The candle of claim 7, wherein the wick wax has a composition different from the wax composition of the candle.

9. The candle of claim 1, wherein the candle achieves a 99.12% reduction in Methicillin Resistant *Staphylococcus epidermidis,* 99.97% reduction in *Listeria innocua,* 99.78% reduction in *Pseudomonas syringae,* 99.99% reduction in *Klebsiella aerogenes,* 99.74% reduction in MS2 bacteriophage, 99.15% reduction in PhiX-174, 97.71% reduction in *Candida albicans*, and 82% reduction in *Aspergillus brasiliensis* as a result of combustion of the candle.

10. The candle of claim 1, wherein the nanoparticles in the wick comprise metal nanowires or nanofibers integrated into the wick, and wherein the metal nanowires or nanofibers are composed of silver, copper, or zinc, or a combination thereof.

11. The candle of claim 9, wherein the metal nanowires or nanofibers are to generate additional metal nanoparticles during burning of the candle.

12. The candle of claim 1, further comprising fragrance additives blended with the wax composition, wherein the fragrance additives comprise essential oils, terpenes, and fragrance compounds, or a combination thereof.

13. A method for air purification, the method comprising:
providing a candle comprising a wax composition, wherein the wax composition comprises:
a blend of long-chain waxes, medium-chain waxes, and short-chain waxes, wherein the long-chain waxes comprise hydrogenated waxes having carbon chain lengths of C38-C44 and are present in an amount of 0-15% of a total composition of the wax composition, the medium-chain waxes comprise waxes having carbon chain lengths of C16-C20 and are present in an amount of 60-100% of the total composition of the wax composition, and the short-chain waxes comprise waxes having carbon chain lengths less than C16 and are present in an amount of 0-15% of the total composition of the wax composition;
a plurality of metal nanoparticles embedded within the wax composition and are to be released into surrounding air during burning of the candle for neutralizing airborne pathogens, wherein the plurality of metal nanoparticles are uniformly dispersed within the wax composition through high-shear mixing, and wherein:

the plurality of nanoparticles are less than 50 nm in size, are composed of alloy metals comprising silver, copper, zinc, or gold alloys, or a combination thereof, and are coated, and are present in a concentration range of 1 to 50 micrograms of nanoparticles per gram of wax composition; and a wick for burning the wax composition;

burning the candle to release the plurality of metal nanoparticles and metal ions into the surrounding air, wherein burning the candle releases metal nanoparticles into the surrounding air creating charged nucleation points that attract airborne particulates to form complexes infused with the plurality of metal nanoparticles, and wherein burning the candle achieves at least 60% reduction in airborne microorganisms selected from the group consisting of Gram-positive bacteria, Gram-negative bacteria, enveloped viruses, non-enveloped viruses, yeast, and mold spores.

14. The method of claim 13, wherein the released nanoparticles and at least incomplete combusted long chain waxes agglomerate and neutralize airborne microorganisms.

15. The method of claim 13, wherein the candle comprises metal nanowires or nanofibers integrated into the wick, and wherein the metal nanowires or nanofibers are to generate additional metal nanoparticles during burning of the candle.

16. The method of claim 13, wherein a burning rate of the candle is between 5 and 20 grams per hour.

17. A method for manufacturing a candle, the method comprising:

blending long-chain waxes, medium-chain waxes, and short-chain waxes to form a wax composition, wherein:

the long-chain waxes comprise hydrogenated waxes having carbon chain lengths of C38-C44 and are present in an amount of 0-15% of a total composition of the wax composition, the medium-chain waxes comprise waxes having carbon chain lengths of C16-C20 and are present in an amount of 60-100% of the total composition of the wax composition, and the short-chain waxes comprise waxes having carbon chain lengths less than C16 and are present in an amount of 0-15% of the total composition of the wax composition;

integrating a plurality of metal nanoparticles into the wax composition, wherein:

the plurality of nanoparticles are less than 50 nm in size, are composed of alloy metals comprising silver, copper, zinc, or gold alloys, or a combination thereof, and are coated, are present in a concentration range of 1 to 50 micrograms of nanoparticles per gram of wax composition, and are uniformly dispersed within the wax composition through high-shear mixing;

fabricating a wick;

integrating the wick into the wax composition; and allowing the wax composition to solidify, wherein the candle is configured to burn releasing metal nanoparticles into the air and creating charged nucleation points that attract airborne particulates to form complexes infused with the plurality of metal nanoparticles, and wherein burning the candle achieves at least 60% reduction in airborne microorganisms selected from the group consisting of Gram-positive bacteria, Gram-negative bacteria, enveloped viruses, non-enveloped viruses, yeast, and mold spores.

18. The method of claim 17, wherein the blending comprises hydrogenating at least a portion of the long-chain waxes.

19. The method of claim 17, wherein the candle achieves a 99.12% reduction in Methicillin Resistant *Staphylococcus epidermidis,* 99.97% reduction in *Listeria innocua,* 99.78% reduction in *Pseudomonas syringae,* 99.99% reduction in *Klebsiella aerogenes,* 99.74% reduction in MS2 bacteriophage, 99.15% reduction in PhiX-174, 97.71% reduction in *Candida albicans*, and 82% reduction in *Aspergillus brasiliensis* as a result of combustion of the candle.

* * * * *